(12) United States Patent
Tsai et al.

(10) Patent No.: US 12,455,435 B2
(45) Date of Patent: Oct. 28, 2025

(54) LENS ELEMENT, IMAGING LENS ASSEMBLY, CAMERA MODULE AND ELECTRONIC DEVICE

(71) Applicant: LARGAN PRECISION CO., LTD., Taichung (TW)

(72) Inventors: Chun-Hua Tsai, Taichung (TW); Lin-An Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 483 days.

(21) Appl. No.: 18/154,079

(22) Filed: Jan. 13, 2023

(65) Prior Publication Data

US 2023/0296863 A1 Sep. 21, 2023

(30) Foreign Application Priority Data

Feb. 25, 2022 (TW) ................... 111107139

(51) Int. Cl.
| | |
|---|---|
| *G02B 13/00* | (2006.01) |
| *G02B 1/04* | (2006.01) |
| *G02B 3/04* | (2006.01) |
| *G02B 7/02* | (2021.01) |
| *H04N 23/55* | (2023.01) |

(52) U.S. Cl.
CPC ......... *G02B 13/0045* (2013.01); *G02B 1/041* (2013.01); *G02B 3/04* (2013.01); *G02B 7/021* (2013.01); *H04N 23/55* (2023.01)

(58) Field of Classification Search
CPC ...... G02B 13/0045; G02B 1/041; G02B 3/04; G02B 7/021; H04N 23/55
See application file for complete search history.

(56) References Cited

U.S. PATENT DOCUMENTS

| | | |
|---|---|---|
| 7,830,610 B2 | 11/2010 | Nishizawa et al. |
| 9,798,048 B2 | 10/2017 | Chou |
| 9,946,047 B2 | 4/2018 | Lin |
| 10,001,624 B2 | 6/2018 | Tsai |
| 10,018,808 B2 * | 7/2018 | Chou ................ G02B 13/0045 |
| 10,114,152 B2 | 10/2018 | Chou |
| 10,317,648 B2 | 6/2019 | Chou |
| 10,436,952 B2 | 10/2019 | Chou |
| 10,502,873 B2 | 12/2019 | Chou |
| 10,527,756 B2 | 1/2020 | Chou |

(Continued)

*Primary Examiner* — Nathanael R Briggs
(74) *Attorney, Agent, or Firm* — McClure, Qualey & Rodack, LLP

(57) ABSTRACT

A lens element includes an optical effective portion, a peripheral portion and protruding structures. The optical effective portion includes a first optical surface and a second optical surface, wherein the second optical surface and the first optical surface are disposed relative to each other. The peripheral portion includes a first peripheral surface, a second peripheral surface and an outer annular surface. The first peripheral surface and the first optical surface face towards the same side. The second peripheral surface and the second optical surface face towards the same side. The outer annular surface is connected to the first peripheral surface and the second peripheral surface. The protruding structures are disposed on the first peripheral surface, the protruding structures extend along a spiral path and are disposed at intervals, and the spiral path surrounds the optical effective portion.

25 Claims, 23 Drawing Sheets

(56) References Cited

U.S. PATENT DOCUMENTS

| | | |
|---|---|---|
| 10,656,392 B2 | 5/2020 | Chou |
| 10,928,554 B2 | 2/2021 | Chou |
| 11,156,795 B2 | 10/2021 | Wan |
| 2011/0090582 A1 | 4/2011 | Chou |

* cited by examiner

LENS ELEMENT, IMAGING LENS ASSEMBLY, CAMERA MODULE AND ELECTRONIC DEVICE

RELATED APPLICATIONS

This application claims priority to Taiwan Application Serial Number 111107139, filed Feb. 25, 2022, which is herein incorporated by reference.

BACKGROUND

Technical Field

The present disclosure relates to a lens element, an imaging lens assembly and a camera module. More particularly, the present disclosure relates to a lens element, an imaging lens assembly and a camera module applicable to portable electronic devices.

Description of Related Art

In recent years, portable electronic devices have developed rapidly. For example, intelligent electronic devices and tablets have been filled in the lives of modern people, and camera modules, imaging lens assemblies and lens elements mounted on portable electronic devices have also prospered. However, as technology advances, the quality requirements of the lens element are becoming higher and higher. Therefore, a lens element, which can prevent from warpage or deformation during the demolding process, needs to be developed.

SUMMARY

According to one aspect of the present disclosure, a lens element has a central axis, and includes an optical effective portion, a peripheral portion and a plurality of protruding structures. The central axis passes through the optical effective portion, and the optical effective portion includes a first optical surface and a second optical surface, wherein the second optical surface and the first optical surface are disposed relative to each other. The peripheral portion surrounds the optical effective portion, and includes a first peripheral surface, a second peripheral surface and an outer annular surface. The first peripheral surface and the first optical surface face towards the same side. The second peripheral surface and the second optical surface face towards the same side. The outer annular surface is connected to the first peripheral surface and the second peripheral surface. The protruding structures are disposed on the first peripheral surface, the protruding structures extend along a spiral path and are disposed at intervals, and the spiral path surrounds the optical effective portion and is tapered towards the central axis. A first one of the protruding structures on the spiral path is a first protruding structure, and a last one of the protruding structures on the spiral path is a last protruding structure. When a distance between the first protruding structure and the central axis is DS, and a distance between the last protruding structure and the central axis is DE, the following condition is satisfied: 0.005 mm<DS−DE<1 mm.

According to one aspect of the present disclosure, an imaging lens assembly includes a plastic lens barrel and an imaging lens element set, wherein the imaging lens element set is accommodated in the plastic lens barrel, and the imaging lens element set includes at least one of the lens element of the aforementioned aspect.

According to one aspect of the present disclosure, a camera module includes the imaging lens assembly of the aforementioned aspect and an image sensor, wherein the image sensor is disposed on an image surface of the imaging lens assembly.

According to one aspect of the present disclosure, an electronic device includes the camera module of the aforementioned aspect.

According to one aspect of the present disclosure, a lens element has a central axis, and includes an optical effective portion, a peripheral portion and a plurality of protruding structures. The optical effective portion includes a first optical surface and a second optical surface, wherein the second optical surface and the first optical surface are disposed relative to each other. The peripheral portion surrounds the optical effective portion, and includes a first peripheral surface, a second peripheral surface and an outer annular surface. The first peripheral surface and the first optical surface face towards the same side. The second peripheral surface and the second optical surface face towards the same side. The outer annular surface is connected to the first peripheral surface and the second peripheral surface. The protruding structures are disposed on the first peripheral surface, the protruding structures extend along a spiral path and are disposed at intervals, and the spiral path surrounds the optical effective portion and is tapered towards the central axis. Each of at least three of the protruding structures has a first identification end and a second identification end on a cross section vertical to the first peripheral surface, each of the first identification ends is connected to the first peripheral surface, and a spacing distance is between each of the second identification ends and the first peripheral surface. When an angle is formed between a side of each of the protruding structures at the second identification end and the first peripheral surface, and the angle is a, the following condition is satisfied: 45 degrees≤α≤90 degrees.

According to one aspect of the present disclosure, an imaging lens assembly includes a plastic lens barrel and an imaging lens element set, wherein the imaging lens element set is accommodated in the plastic lens barrel, and the imaging lens element set includes at least one of the lens element of the aforementioned aspect.

According to one aspect of the present disclosure, a camera module includes the imaging lens assembly of the aforementioned aspect and an image sensor, wherein the image sensor is disposed on an image surface of the imaging lens assembly.

According to one aspect of the present disclosure, an electronic device includes the camera module of the aforementioned aspect.

DETAILED DESCRIPTION

Figure 1A:
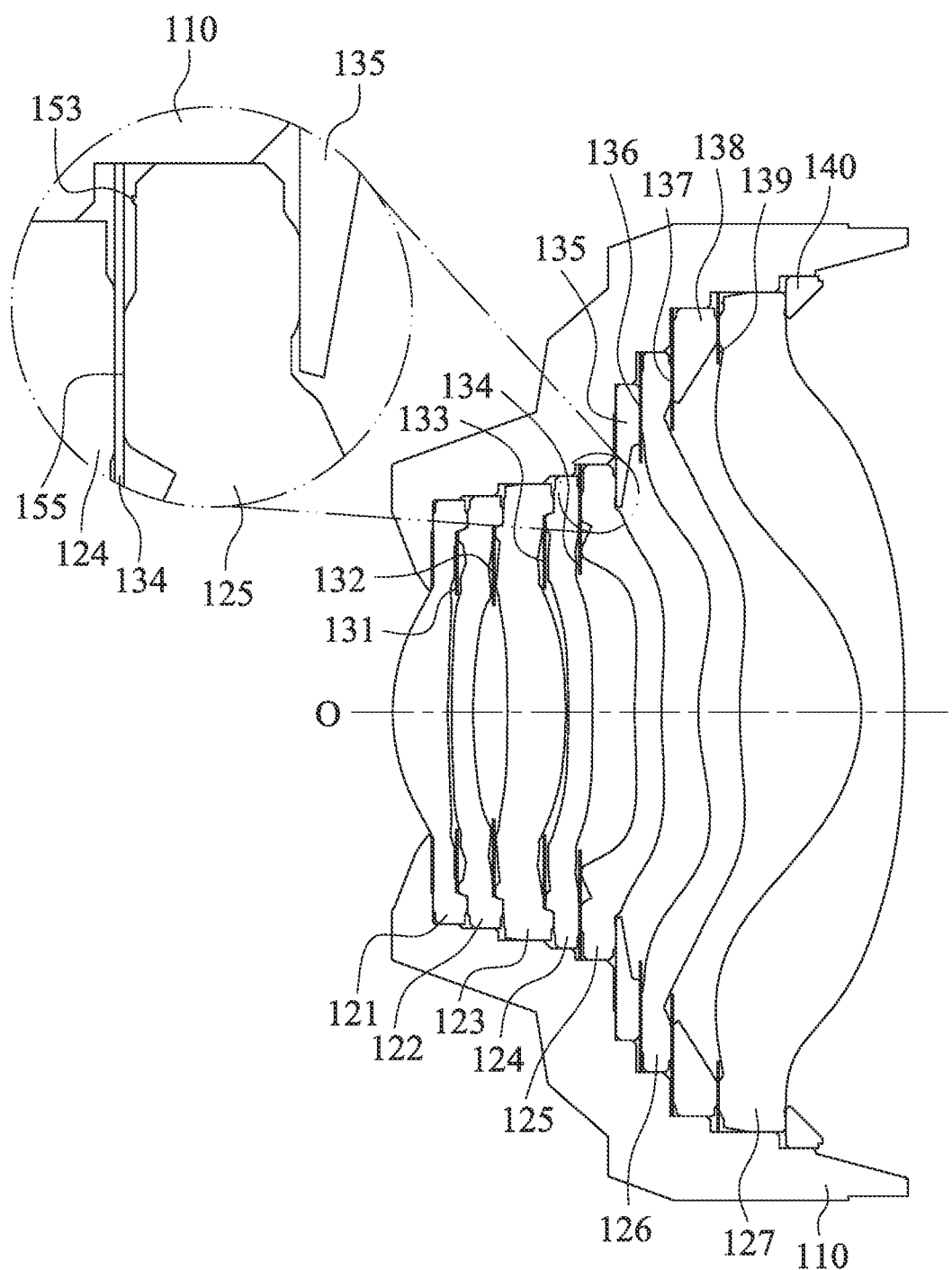
FIG. 1A is a schematic view of an imaging lens assembly according to the 1st example of the present disclosure.

The present disclosure provides a lens element, wherein the lens element has a central axis, and includes an optical effective portion, a peripheral portion and a plurality of protruding structures. The central axis passes through the optical effective portion, and includes a first optical surface and a second optical surface, wherein the second optical surface and the first optical surface are disposed relative to each other. The peripheral portion surrounds the optical effective portion, and includes a first peripheral surface, a second peripheral surface and an outer annular surface, wherein the first peripheral surface and the first optical surface face towards the same side, the second peripheral surface and the second optical surface face towards the same side, and the outer annular surface is connected to the first peripheral surface and the second peripheral surface. The protruding structures are disposed on the first peripheral surface, the protruding structures extend along a spiral path and are disposed at intervals, and the spiral path surrounds the optical effective portion and is tapered towards the central axis.

The degree of fitting between the mold and the lens element can be enhanced during the molding process of the lens elements by disposing the protruding structures, so that the warpage or the deformation can be prevented during the demolding process. Further, the faster processing flow of the mold can be obtained by disposing the protruding structures along a spiral path to enhance the efficiency of the process of mold. Also, the number and the distribution of the protruding structures can be more conveniently adjusted according to the different design and molding conditions.

In particular, the spiral path can be tapered clockwise towards the center, or the spiral path can be tapered counterclockwise towards the center, wherein the spiral path can be Archimedean spiral, Fermat's spiral or Logarithmic spiral, but the present disclosure is not limited thereto. Moreover, when r, θ are two coordinate axes of the polar coordinate system with the central axis as the origin, respectively, a, b are the constants, e is the universal constant, and the detail formulas of the spiral path as follows:

Archimedean spiral: $r = a + b\theta$;

Fermat's spiral: $r = a \times \sqrt{\theta}$; and

Logarithmic spiral: $r = a \times e^{b\theta}$.

Moreover, the protruding structures extend along the spiral path, which represents the protruding structures extend from a first position on the spiral path to a second position on the spiral path. Further, the second position is closer to the central axis than the first position to the central axis.

Each of at least three of the protruding structures can have a first identification end and a second identification end on a cross section vertical to the first peripheral surface, wherein each of the first identification ends is connected to the first peripheral surface, and a spacing distance is between each of the second identification ends and the first peripheral surface. In particular, the first identification end and the second identification end can be one end of each of the protruding structures close to the optical effective portion and the other end of each of the protruding structures away from the optical effective portion, respectively, which can be observed and identified from a direction vertical to the first peripheral surface. Or, the first identification end and the second identification end can be one end of each of the protruding structures away from the optical effective portion and the other end of each of the protruding structures close to the optical effective portion, respectively.

The first one of the protruding structures on the spiral path can be a first protruding structure, and the last one of the protruding structures on the spiral path can be a last protruding structure. Further, when a distance between the first protruding structure and the central axis is DS, and a distance between the last protruding structure and the central axis is DE, the following condition can be satisfied: 0.005 mm<DS−DE<1 mm. When DS−DE satisfies the aforementioned condition, the more balance adhesion can be provided. Further, the following condition can be satisfied: 0.015 mm≤DS−DE≤0.8 mm. When DS−DE satisfies the aforementioned condition, the replacement rate of the mold can be further reduced so as to reduce the manufacturing cost.

When an angle is formed between a side of each of the protruding structures at the second identification end and the first peripheral surface, and the angle is a, the following condition can be satisfied: 45 degrees≤α≤90 degrees. Therefore, the lens element and the mold can be closer. Further, the following condition can be satisfied: 60 degrees≤α≤90 degrees. When a satisfies the aforementioned condition, the processing difficulty of the mold can be reduced, and the demolding feasibility of the mold can be provided.

The protruding structures can be gradually close along the spiral path towards the central axis. Therefore, the aforementioned disposition is favorable for the automated process of the mold processing.

The lens element can be formed by an injection molding, and the lens element can further include at least one gate trace, wherein the gate trace is disposed on the outer annular surface. Therefore, the lens element with high precision and compact size can be provided.

At least one of the first optical surface and the second optical surface can be an optical aspheric surface. Therefore, the lens element with high resolution can be provided.

Each of the protruding structures on the cross section vertical to the first peripheral surface can further have a top, the top is a highest point of each of the protruding structures, and a spacing distance between the top and the second identification end along a direction vertical to the central axis is less than a spacing distance between the top and the first identification end along the direction vertical to the central axis. Therefore, the warpage or the deformation of the lens element can be more effectively prevented.

When a central distance between the first optical surface and the first peripheral surface is t, and a central distance between the first optical surface and the second optical surface is CT, the following condition can be satisfied: 0.8<t/CT<5.5. When t/CT satisfies the aforementioned condition, the molding yield of the lens element, which is prone to warping or deforming, can be effectively enhanced. Further, the following condition can be satisfied: 1.0<t/CT<5.0. When t/CT satisfies the aforementioned condition, the dimension tolerance of the optical effective portion can be further optimized.

When a distance between the outer annular surface and the central axis is w, and the distance between the first protruding structure and the central axis is DS, the following condition can be satisfied: 0.7<DS/ψ<1. The probability of the stray light can be effectively reduced by disposing the protruding structures on the outer annular surface closer to the lens element.

When a length of each of the protruding structures along the spiral path is S1, and a spacing distance between the protruding structures along the spiral path is S2, the following condition can be satisfied: 0.2<S1/S2<5. When S1/S2 satisfies the aforementioned condition, the more suitable density interval can be obtained, and the structural integrity can be maintained. In particular, the spacing distance between the protruding structures along the spiral path is the spacing distance between adjacent two of the protruding structures along the spiral path.

Each of the aforementioned features of the lens element can be utilized in various combinations for achieving the corresponding effects.

The present disclosure provides an imaging lens assembly, which includes a plastic lens barrel and an imaging lens element set. The imaging lens element set can be accommodated in the plastic lens barrel and includes at least one of the aforementioned lens element.

The lens element can further include a receiving surface, wherein the receiving surface and the first optical surface face towards the same side, the receiving surface is closer to the optical effective portion than the protruding structures to the optical effective portion, and the receiving surface is against an element adjacent to the receiving surface. Therefore, the flatness of the receiving surface can be ensured, so that the assembling tolerance can be reduced for providing the imaging lens assembly with high resolution.

Each of the aforementioned features of the imaging lens assembly can be utilized in various combinations for achieving the corresponding effects.

The present disclosure provides a camera module, which includes the aforementioned imaging lens assembly and an image sensor, and the image sensor is disposed on an image surface of the imaging lens assembly.

The present disclosure provides an electronic device, which includes the aforementioned camera module.

According to the aforementioned embodiment, specific examples are provided, and illustrated via figures.

1st Example

FIG. 1A is a schematic view of an imaging lens assembly 10 according to the 1st example of the present disclosure. In FIG. 1A, the imaging lens assembly 10 includes a plastic lens barrel 110 and an imaging lens element set (its reference numeral is omitted), wherein the imaging lens element set is accommodated in the plastic lens barrel 110.

In particular, the imaging lens element set, in order from an object side to an image side, includes a lens element 121, a light blocking element 131, a lens element 122, a light blocking element 132, a lens element 123, a light blocking element 133, a lens element 124, a light blocking element 134, a lens element 125, light blocking elements 135, 136, a lens element 126, light blocking elements 137, 138, 139, a lens element 127 and a retainer 140, wherein the optical features such as structures, surface shapes and so on of the lens elements, the light blocking elements and the retainer can be disposed according to different imaging demand, and the optical features are not limited thereto.

Figure 1B:
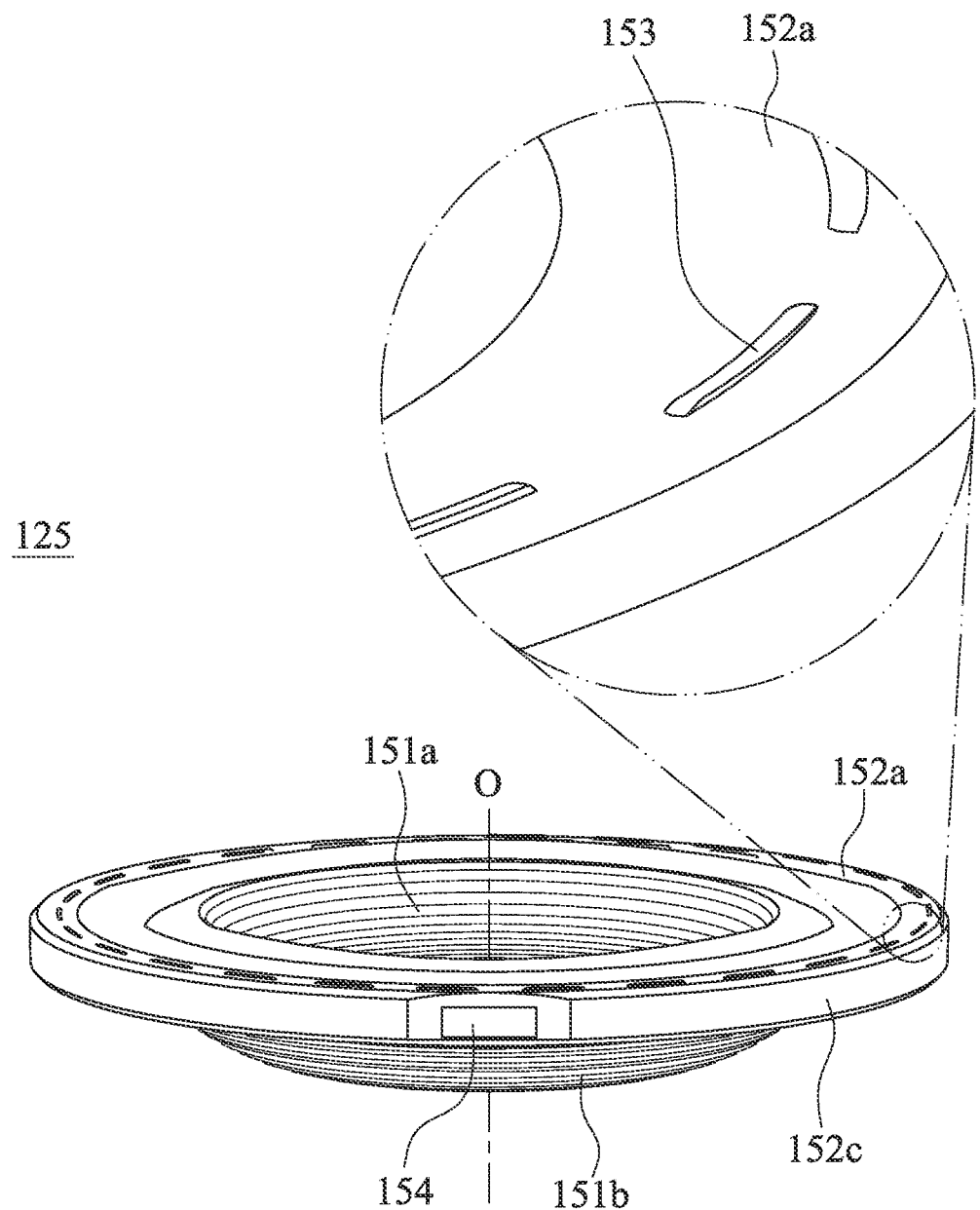
FIG. 1B is a three dimensional view of the lens element according to the 1st example in FIG. 1A.
Figure 1C:
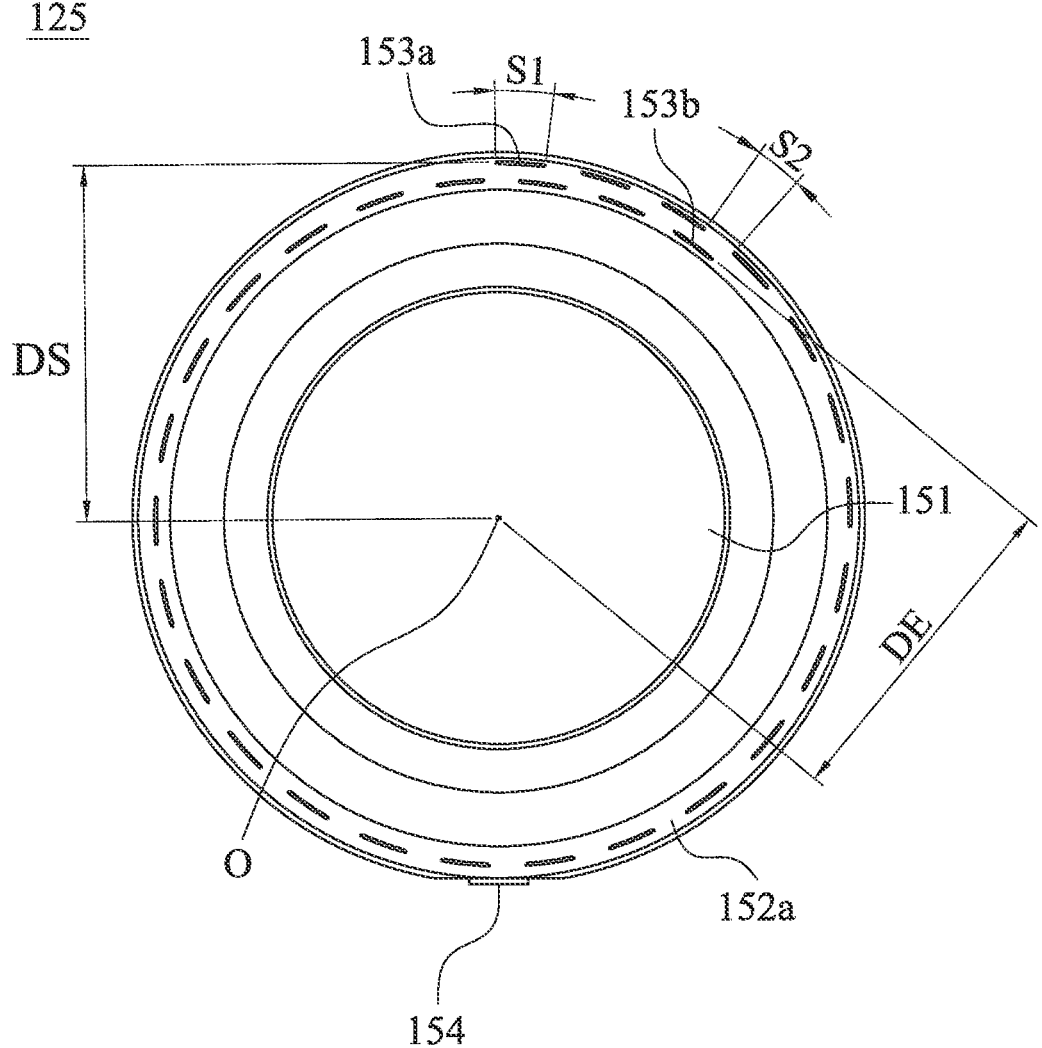
FIG. 1C is a schematic view of the lens element according to the 1st example in FIG. 1A.
Figure 1D:
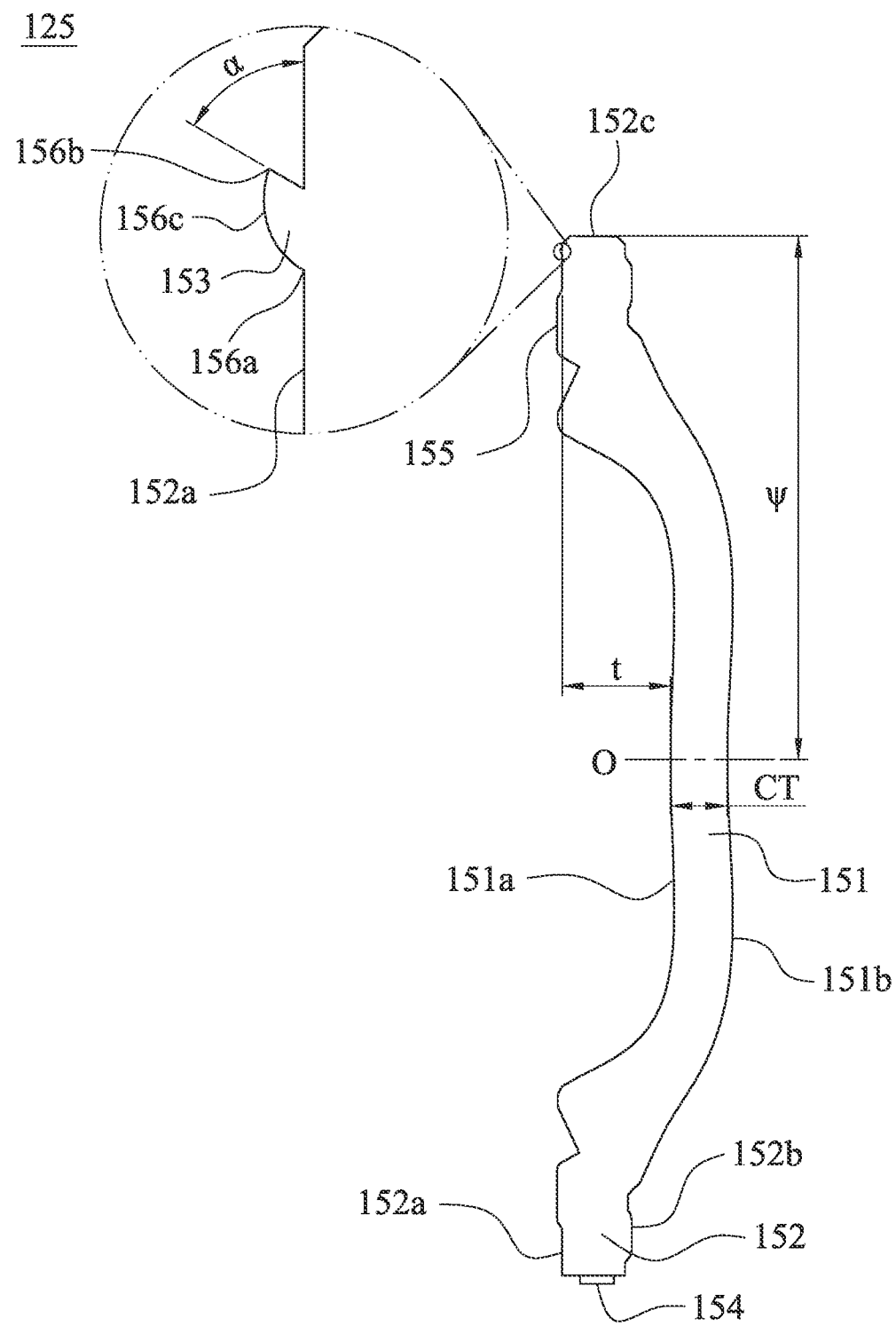
FIG. 1D is a schematic view of parameters of the lens element according to the 1st example in FIG. 1A.

FIG. 1B is a three dimensional view of the lens element 125 according to the 1st example in FIG. 1A. FIG. 1C is a schematic view of the lens element 125 according to the 1st example in FIG. 1A. FIG. 1D is a schematic view of parameters of the lens element 125 according to the 1st example in FIG. 1A. In FIGS. 1A to 1D, the lens element 125 has a central axis O, and includes an optical effective portion 151, a peripheral portion 152 and a plurality of protruding structures 153, wherein the central axis O passes through the optical effective portion 151, and the peripheral portion 152 surrounds the optical effective portion 151. The degree of fitting between the mold (not shown) and the lens element 125 can be enhanced during the molding process of the lens element 125 by disposing the protruding structures 153, so that the warpage or the deformation can be prevented during the demolding process.

According to the 1st example, a number of the protruding structures 153 is twenty nine, but the number is not limited thereto.

In FIGS. 1B and 1D, the optical effective portion 151 includes a first optical surface 151a and a second optical surface 151b, wherein the second optical surface 151b and the first optical surface 151a are disposed relative to each other, and both of the first optical surface 151a and the second optical surface 151b are optical aspheric surfaces. Therefore, the lens element with high resolution can be provided.

The peripheral portion 152 surrounds the optical effective portion 151, and includes a first peripheral surface 152a, a second peripheral surface 152b and an outer annular surface 152c, wherein the first peripheral surface 152a and the first optical surface 151a face towards the same side, the second peripheral surface 152b and the second optical surface 151b face towards the same side, and the outer annular surface 152c is connected to the first peripheral surface 152a and the second peripheral surface 152b.

In FIG. 1C, the protruding structures 153 are disposed on the first peripheral surface 152a, the protruding structures 153 extend along a spiral path and are disposed at intervals, and the spiral path surrounds the optical effective portion 151 and is tapered towards the central axis O. The faster processing flow of the mold can be obtained by disposing the protruding structures 153 along a spiral path to enhance the efficiency of the process of mold. Also, the number and the distribution of the protruding structures 153 can be more conveniently adjusted according to the different design and molding conditions. Furthermore, the protruding structures 153 are gradually close along the spiral path towards the central axis O. Therefore, the aforementioned disposition is favorable for the automated process of the mold processing.

In particular, the spiral path can be tapered clockwise towards the center, or the spiral path can be tapered counterclockwise towards the center, wherein the spiral path can be Archimedean spiral, Fermat's spiral or Logarithmic spiral, but the present disclosure is not limited thereto. Further, the protruding structures 153 extend along the spiral path, which represents the protruding structures 153 extend from a first position on the spiral path to a second position on the spiral path. Further, the second position is closer to the central axis O than the first position to the central axis O.

In FIG. 1D, each of at least three of the protruding structures 153 has a first identification end 156a and a second identification end 156b on a cross section vertical to the first peripheral surface 152a, wherein each of the first identification ends 156a is connected to the first peripheral surface 152a, and a spacing distance is between each of the second identification ends 156b and the first peripheral surface 152a. In particular, observing and identifying from a direction vertical to the first peripheral surface 152a, the first identification end 156a and the second identification end 156b can be one end of each of the protruding structures 153 close to the optical effective portion 151 and the other end of each of the protruding structures 153 away from the optical effective portion 151, respectively.

Moreover, each of the protruding structures 153 on the cross section vertical to the first peripheral surface 152a further has a top 156c, wherein the top 156c is a highest point of each of the protruding structures 153, and a spacing distance between the top 156c and the second identification end 156b along a direction vertical to the central axis O is less than a spacing distance between the top 156c and the first identification end 156a along the direction vertical to the central axis O. Therefore, the warpage or the deformation of the lens element 125 can be more effectively prevented.

In FIGS. 1B to 1D, the lens element 125 is formed by an injection molding, and the lens element 125 can further include at least one gate trace 154, wherein the gate trace 154 is disposed on the outer annular surface 152c. Therefore, the lens element with high precision and compact size can be provided.

In FIGS. 1A and 1D, the lens element 125 can further include a receiving surface 155, wherein the receiving surface 155 and the first optical surface 151a face towards the same side, the receiving surface 155 is closer to the optical effective portion 151 than the protruding structures 153 to the optical effective portion 151, and the receiving surface 155 is against the light blocking element 134. Therefore, the flatness of the receiving surface 155 can be ensured, so that the assembling tolerance can be reduced for providing the imaging lens assembly 10 with high resolution.

In FIGS. 1C and 1D, the first one of the protruding structures 153 on the spiral path is a first protruding structure 153a, and the last one of the protruding structures 153 on the spiral path is a last protruding structure 153b, and an angle is formed between a side of each of the protruding structures 153 at the second identification end 156b and the first peripheral surface 152a. When a distance between the first protruding structure 153a and the central axis O is DS, a distance between the last protruding structure 153b and the central axis O is DE, a central distance between the first optical surface 151a and the first peripheral surface 152a is t, a central distance between the first optical surface 151a and the second optical surface 151b is CT, a distance between the outer annular surface 152c and the central axis O is ψ, a length of each of the protruding structures 153 along the spiral path is S1, a spacing distance between the protruding structures 153 along the spiral path is S2, and the angle is α, the following conditions of Table 1 are satisfied.

TABLE 1

| 1st example | | | |
|---|---|---|---|
| DS (mm) | 3.01 | S2 (mm) | 0.31 |
| DE (mm) | 2.843 | α (degree) | 60 |
| t (mm) | 0.639 | DS-DE (mm) | 0.167 |
| CT (mm) | 0.335 | t/CT | 1.907 |
| ψ (mm) | 3.094 | DS/ψ | 0.97 |
| S1 (mm) | 0.42 | S1/S2 | 1.35 |

2nd Example

Figure 2A:
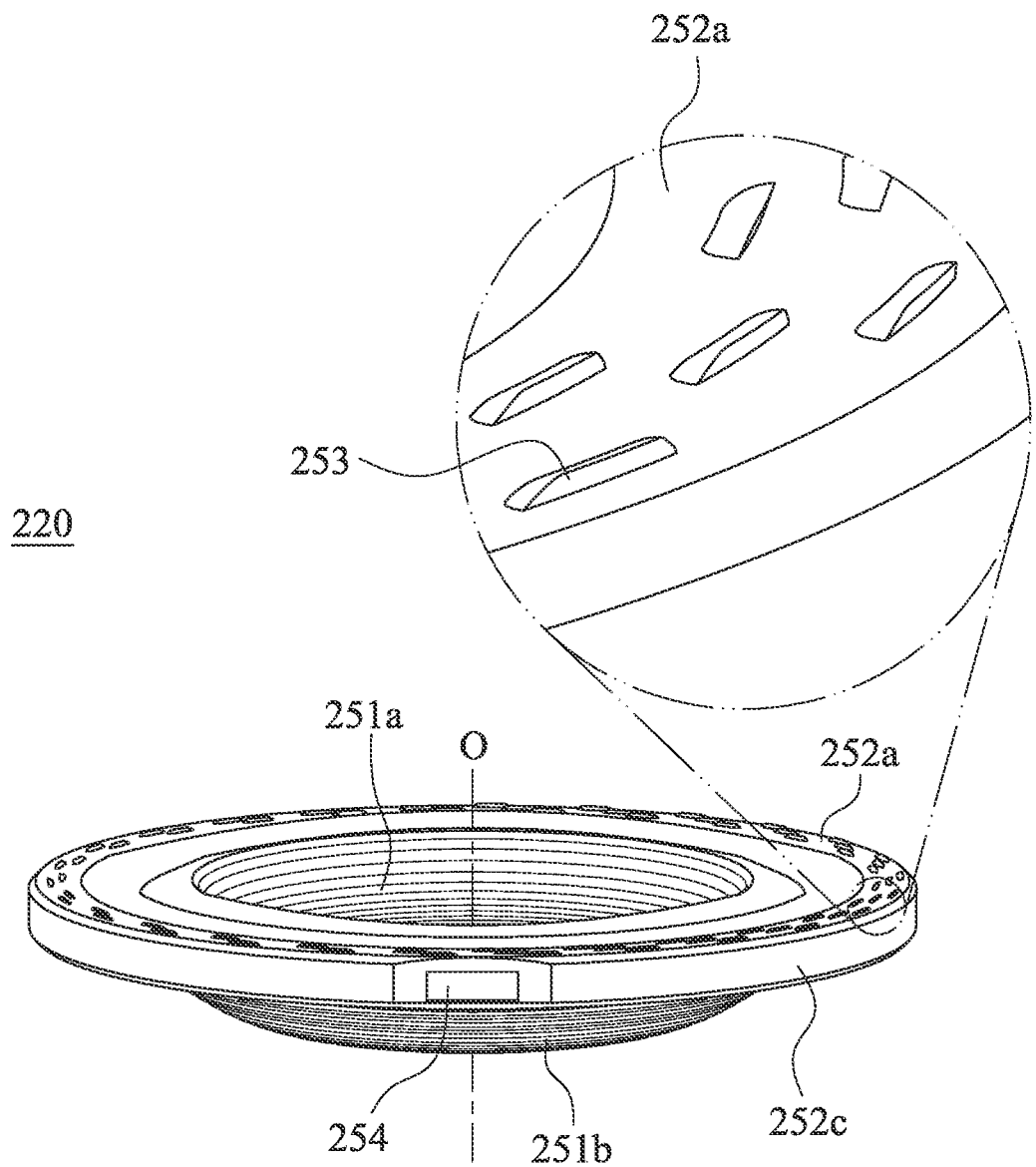
FIG. 2A is a three dimensional view of the lens element according to the 2nd example of the present disclosure.
Figure 2B:
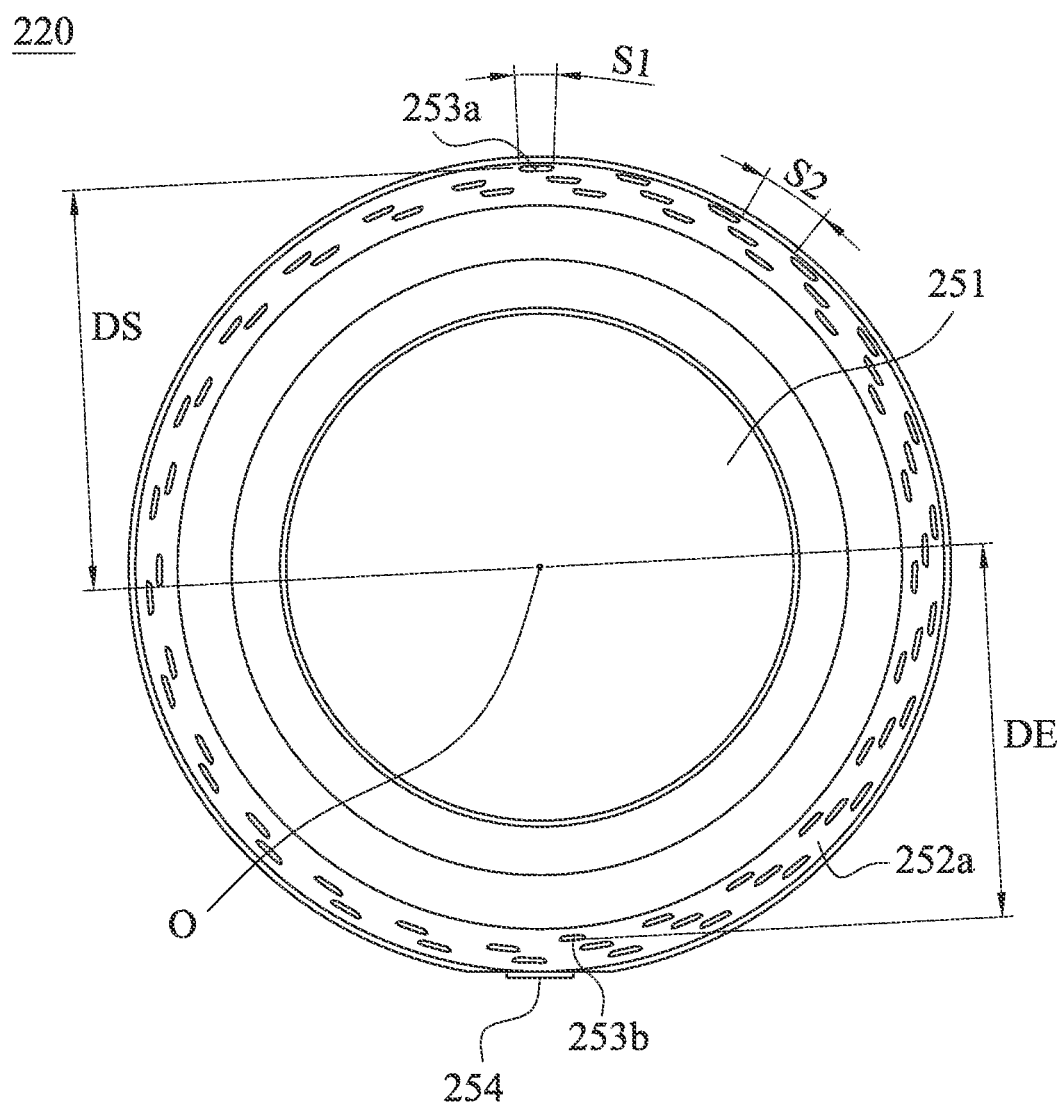
FIG. 2B is a schematic view of the lens element according to the 2nd example in FIG. 2A.
Figure 2C:
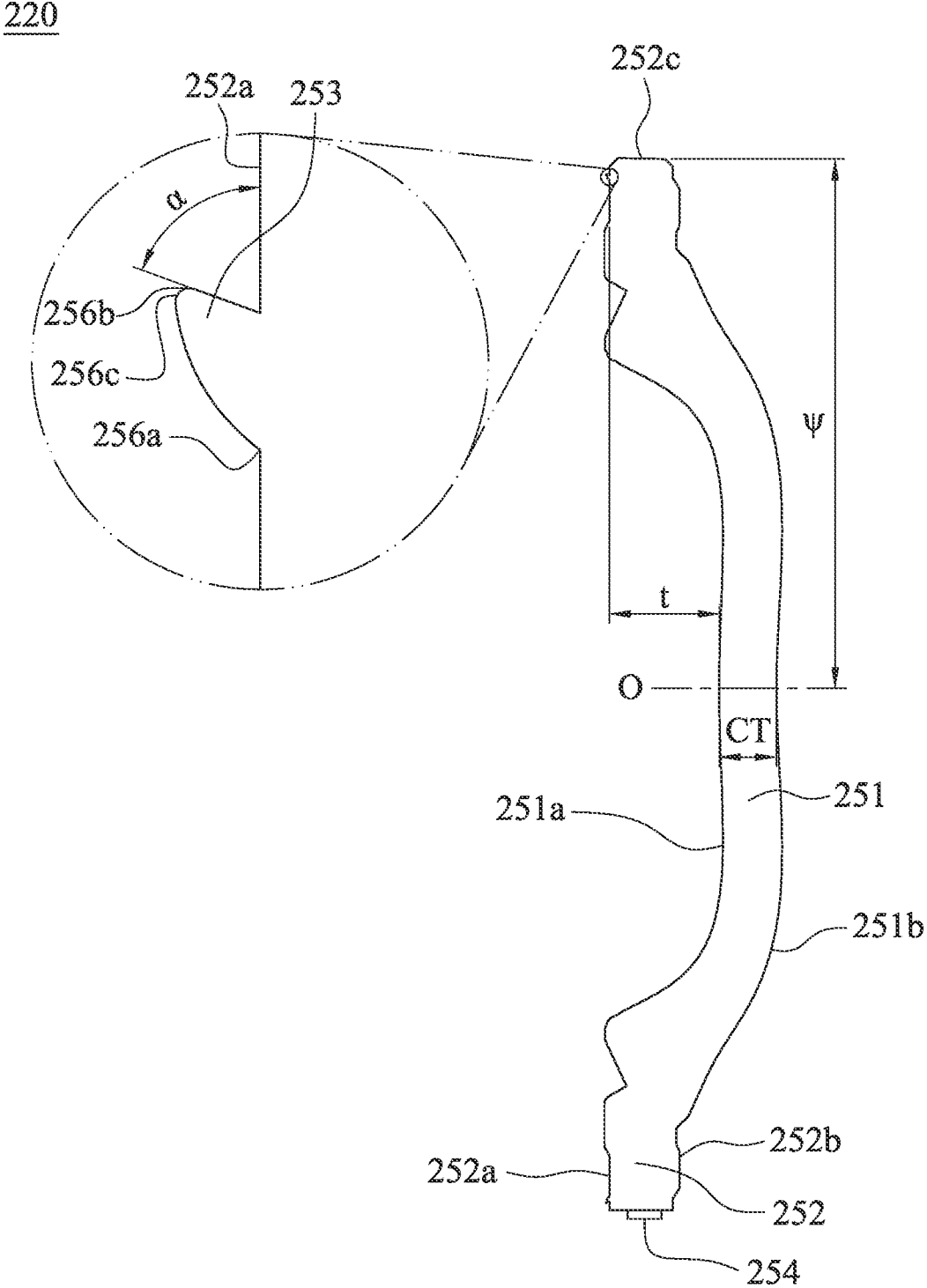
FIG. 2C is a schematic view of parameters of the lens element according to the 2nd example in FIG. 2A.

FIG. 2A is a three dimensional view of the lens element 220 according to the 2nd example of the present disclosure. FIG. 2B is a schematic view of the lens element 220 according to the 2nd example in FIG. 2A. FIG. 2C is a schematic view of parameters of the lens element 220 according to the 2nd example in FIG. 2A. In FIGS. 2A to 2C, the lens element 220 has a central axis O, and includes an optical effective portion 251, a peripheral portion 252 and a plurality of protruding structures 253, wherein the central axis O passes through the optical effective portion 251, and the peripheral portion 252 surrounds the optical effective portion 251. The degree of fitting between the mold (not shown) and the lens element 220 can be enhanced during the molding process of the lens element 220 by disposing the protruding structures 253, so that the warpage or the deformation can be prevented during the demolding process.

According to the 2nd example, a number of the protruding structures 253 is sixty five, but the number is not limited thereto.

The optical effective portion 251 includes a first optical surface 251a and a second optical surface 251b, wherein the second optical surface 251b and the first optical surface 251a are disposed relative to each other, and both of the first optical surface 251a and the second optical surface 251b are optical aspheric surfaces. Therefore, the lens element with high resolution can be provided.

The peripheral portion 252 surrounds the optical effective portion 251, and includes a first peripheral surface 252a, a second peripheral surface 252b and an outer annular surface 252c, wherein the first peripheral surface 252a and the first optical surface 251a face towards the same side, the second peripheral surface 252b and the second optical surface 251b face towards the same side, and the outer annular surface 252c is connected to the first peripheral surface 252a and the second peripheral surface 252b.

In FIG. 2B, the protruding structures 253 are disposed on the first peripheral surface 252a, the protruding structures 253 extend along a spiral path and are disposed at intervals, the spiral path surrounds the optical effective portion 251 and is tapered towards the central axis O, and the protruding structures 253 are gradually close along the spiral path towards the central axis O.

In FIG. 2C, each of at least three of the protruding structures 253 has a first identification end 256a and a second identification end 256b on a cross section vertical to the first peripheral surface 252a, wherein each of the first identification ends 256a is connected to the first peripheral surface 252a, and a spacing distance is between each of the second identification ends 256b and the first peripheral surface 252a. In particular, observing and identifying from a direction vertical to the first peripheral surface 252a, the first identification end 256a and the second identification end 256b can be one end of each of the protruding structures 253 close to the optical effective portion 251 and the other end of each of the protruding structures 253 away from the optical effective portion 251, respectively.

Moreover, each of the protruding structures 253 on the cross section vertical to the first peripheral surface 252a further has a top 256c, wherein the top 256c is a highest point of each of the protruding structures 253, and a spacing distance between the top 256c and the second identification end 256b along a direction vertical to the central axis O is less than a spacing distance between the top 256c and the first identification end 256a along the direction vertical to the central axis O. Therefore, the warpage or the deformation of the lens element 220 can be more effectively prevented.

In FIGS. 2A to 2C, the lens element 220 is formed by an injection molding, and the lens element 220 can further include at least one gate trace 254, wherein the gate trace 254 is disposed on the outer annular surface 252c. Therefore, the lens element with high precision and compact size can be provided.

In FIGS. 2B and 2O, the first one of the protruding structures 253 on the spiral path is a first protruding structure 253a, and the last one of the protruding structures 253 on the spiral path is a last protruding structure 253b, and an angle is formed between a side of each of the protruding structures 253 at the second identification end 256b and the first peripheral surface 252a. When a distance between the first protruding structure 253a and the central axis O is DS, a distance between the last protruding structure 253b and the central axis O is DE, a central distance between the first optical surface 251a and the first peripheral surface 252a is t, a central distance between the first optical surface 251a and the second optical surface 251b is CT, a distance between the outer annular surface 252c and the central axis O is ψ, a length of each of the protruding structures 253 along the spiral path is S1, a spacing distance between the protruding structures 253 along the spiral path is S2, and the angle is α, the following conditions of Table 2 are satisfied.

TABLE 2

| 2nd example | | | |
|---|---|---|---|
| DS (mm) | 3.015 | S2 (mm) | 0.48 |
| DE (mm) | 2.815 | α (degree) | 70 |
| t (mm) | 0.639 | DS-DE (mm) | 0.2 |

TABLE 2-continued

| 2nd example | | | |
|---|---|---|---|
| CT (mm) | 0.335 | t/CT | 1.907 |
| ψ (mm) | 3.094 | DS/ψ | 0.97 |
| S1 (mm) | 0.26 | S1/S2 | 0.54 |

Further, all of other structures and dispositions according to the 2nd example are the same as the structures and the dispositions according to the 1st example, and will not be described again herein.

3rd Example

Figure 3A:
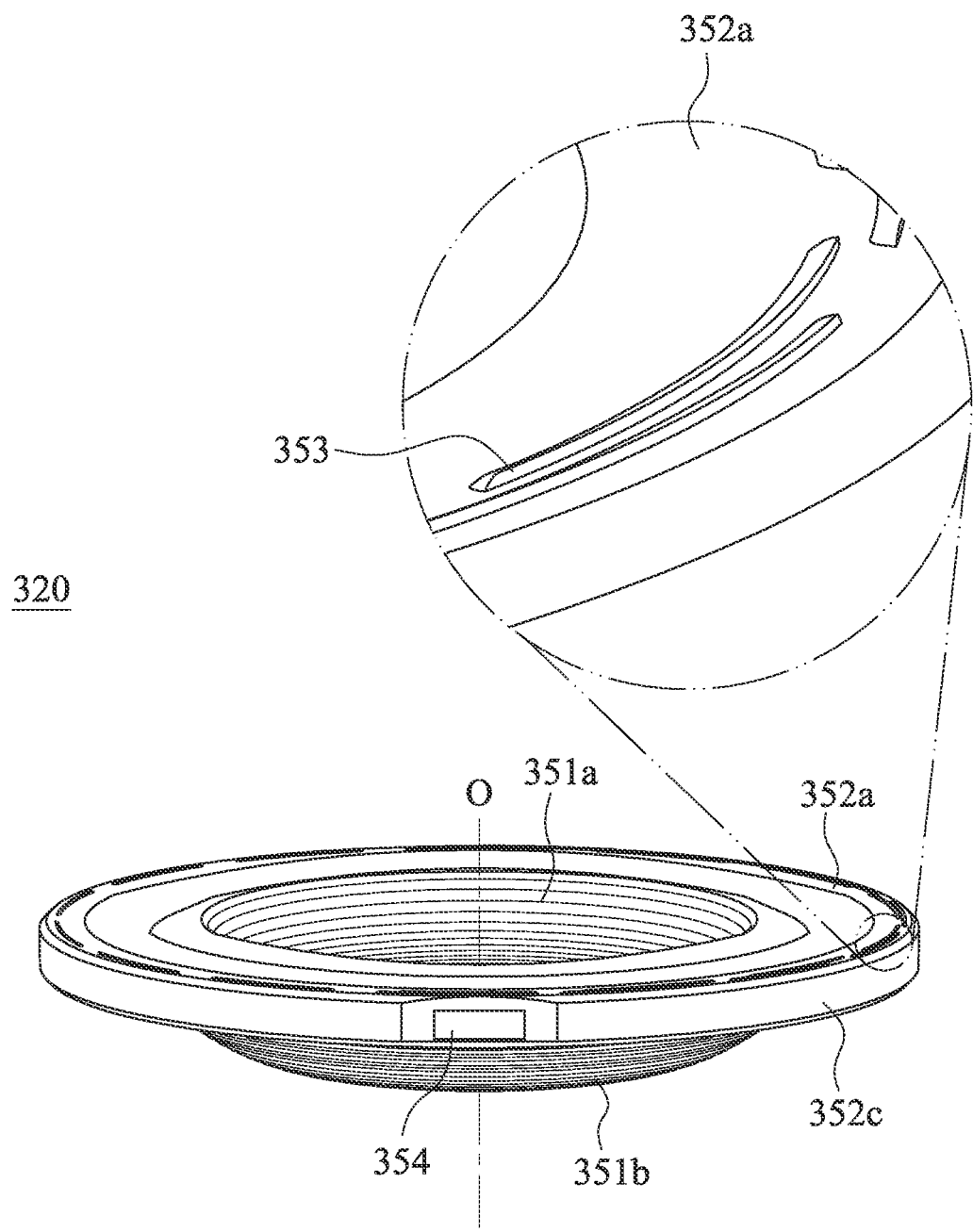
FIG. 3A is a three dimensional view of the lens element according to the 3rd example of the present disclosure.
Figure 3B:
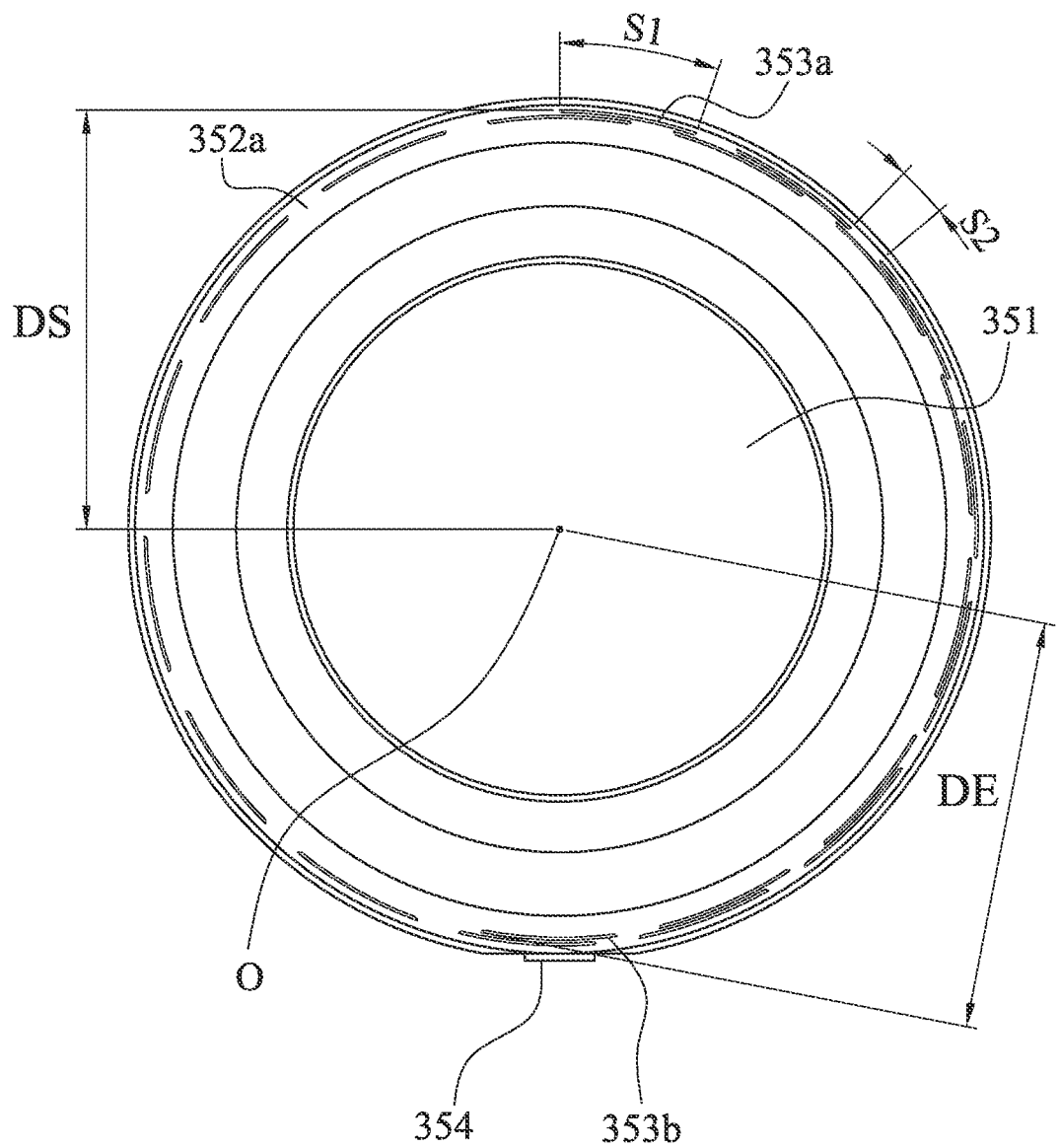
FIG. 3B is a schematic view of the lens element according to the 3rd example in FIG. 3A.
Figure 3C:
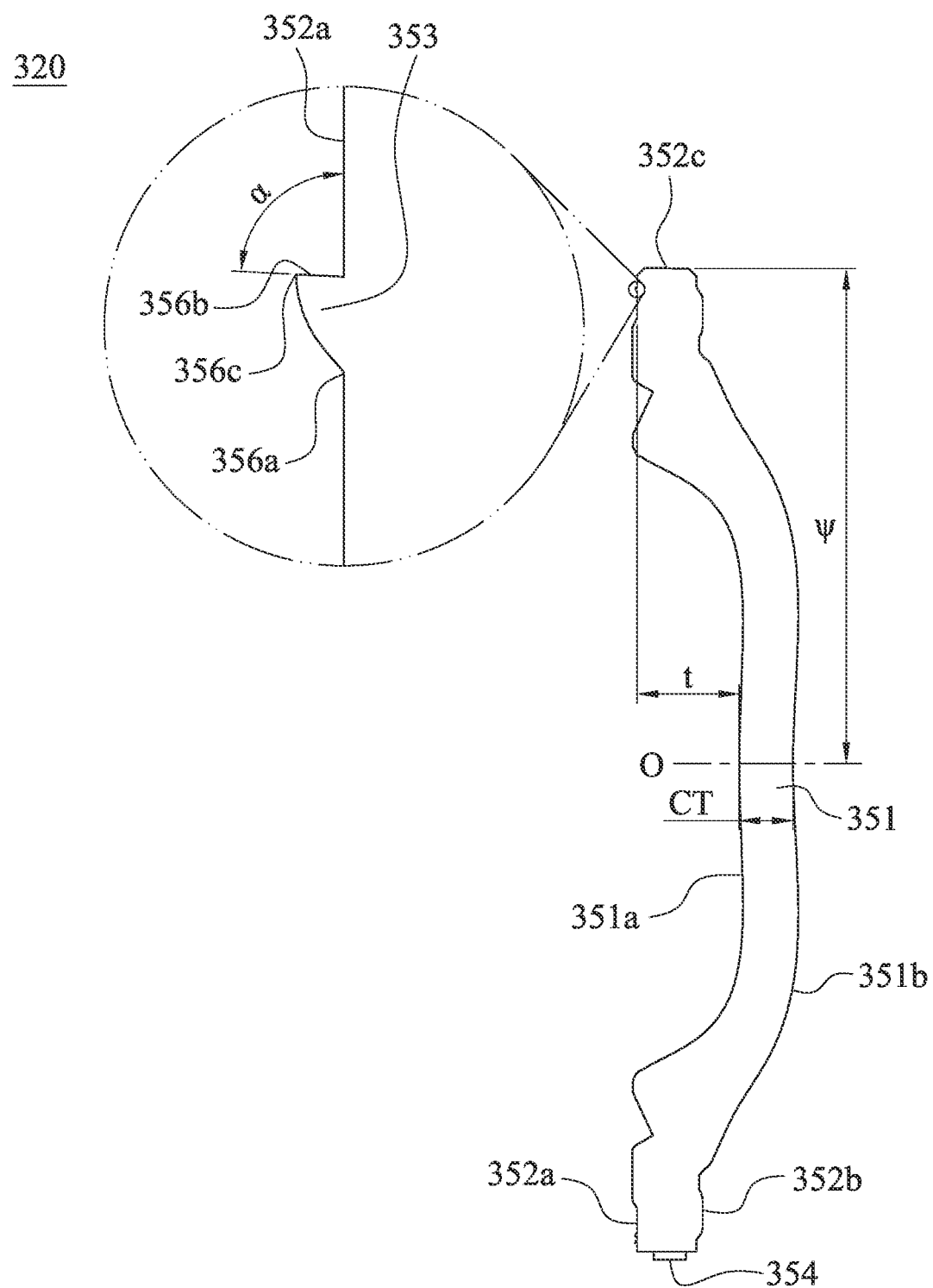
FIG. 3C is a schematic view of parameters of the lens element according to the 3rd example in FIG. 3A.

FIG. 3A is a three dimensional view of the lens element 320 according to the 3rd example of the present disclosure. FIG. 3B is a schematic view of the lens element 320 according to the 3rd example in FIG. 3A. FIG. 3C is a schematic view of parameters of the lens element 320 according to the 3rd example in FIG. 3A. In FIGS. 3A to 3C, the lens element 320 has a central axis O, and includes an optical effective portion 351, a peripheral portion 352 and a plurality of protruding structures 353, wherein the central axis O passes through the optical effective portion 351, and the peripheral portion 352 surrounds the optical effective portion 351. The degree of fitting between the mold (not shown) and the lens element 320 can be enhanced during the molding process of the lens element 320 by disposing the protruding structures 353, so that the warpage or the deformation can be prevented during the demolding process.

According to the 3rd example, a number of the protruding structures 353 is twenty two, but the number is not limited thereto.

The optical effective portion 351 includes a first optical surface 351a and a second optical surface 351b, wherein the second optical surface 351b and the first optical surface 351a are disposed relative to each other, and both of the first optical surface 351a and the second optical surface 351b are optical aspheric surfaces. Therefore, the lens element with high resolution can be provided.

The peripheral portion 352 surrounds the optical effective portion 351, and includes a first peripheral surface 352a, a second peripheral surface 352b and an outer annular surface 352c, wherein the first peripheral surface 352a and the first optical surface 351a face towards the same side, the second peripheral surface 352b and the second optical surface 351b face towards the same side, and the outer annular surface 352c is connected to the first peripheral surface 352a and the second peripheral surface 352b.

In FIG. 3B, the protruding structures 353 are disposed on the first peripheral surface 352a, the protruding structures 353 extend along a spiral path and are disposed at intervals, the spiral path surrounds the optical effective portion 351 and is tapered towards the central axis O, and the protruding structures 353 are gradually close along the spiral path towards the central axis O.

In FIG. 3C, each of at least three of the protruding structures 353 has a first identification end 356a and a second identification end 356b on a cross section vertical to the first peripheral surface 352a, wherein each of the first identification ends 356a is connected to the first peripheral surface 352a, and a spacing distance is between each of the second identification ends 356b and the first peripheral surface 352a. In particular, observing and identifying from a direction vertical to the first peripheral surface 352a, the first identification end 356a and the second identification end 356b can be one end of each of the protruding structures 353 close to the optical effective portion 351 and the other end of each of the protruding structures 353 away from the optical effective portion 351, respectively.

Moreover, each of the protruding structures 353 on the cross section vertical to the first peripheral surface 352a further has a top 356c, wherein the top 356c is a highest point of each of the protruding structures 353, and a spacing distance between the top 356c and the second identification end 356b along a direction vertical to the central axis O is less than a spacing distance between the top 356c and the first identification end 356a along the direction vertical to the central axis O. Therefore, the warpage or the deformation of the lens element 320 can be more effectively prevented.

In FIGS. 3A to 3C, the lens element 320 is formed by an injection molding, and the lens element 320 can further include at least one gate trace 354, wherein the gate trace 354 is disposed on the outer annular surface 352c. Therefore, the lens element with high precision and compact size can be provided.

In FIGS. 3B and 3C, the first one of the protruding structures 353 on the spiral path is a first protruding structure 353a, and the last one of the protruding structures 353 on the spiral path is a last protruding structure 353b, and an angle is formed between a side of each of the protruding structures 353 at the second identification end 356b and the first peripheral surface 352a. When a distance between the first protruding structure 353a and the central axis O is DS, a distance between the last protruding structure 353b and the central axis O is DE, a central distance between the first optical surface 351a and the first peripheral surface 352a is t, a central distance between the first optical surface 351a and the second optical surface 351b is CT, a distance between the outer annular surface 352c and the central axis O is ψ, a length of each of the protruding structures 353 along the spiral path is S1, a spacing distance between the protruding structures 353 along the spiral path is S2, and the angle is α, the following conditions of Table 3 are satisfied.

TABLE 3

3rd example

| | | | |
|---|---|---|---|
| DS (mm) | 3.01 | S2 (mm) | 0.31 |
| DE (mm) | 2.948 | α (degree) | 87 |
| t (mm) | 0.639 | DS-DE (mm) | 0.062 |
| CT (mm) | 0.335 | t/CT | 1.907 |
| ψ (mm) | 3.094 | DS/ψ | 0.97 |
| S1 (mm) | 1.00 | S1/S2 | 3.23 |

Further, all of other structures and dispositions according to the 3rd example are the same as the structures and the dispositions according to the 1st example, and will not be described again herein.

4th Example

Figure 4A:
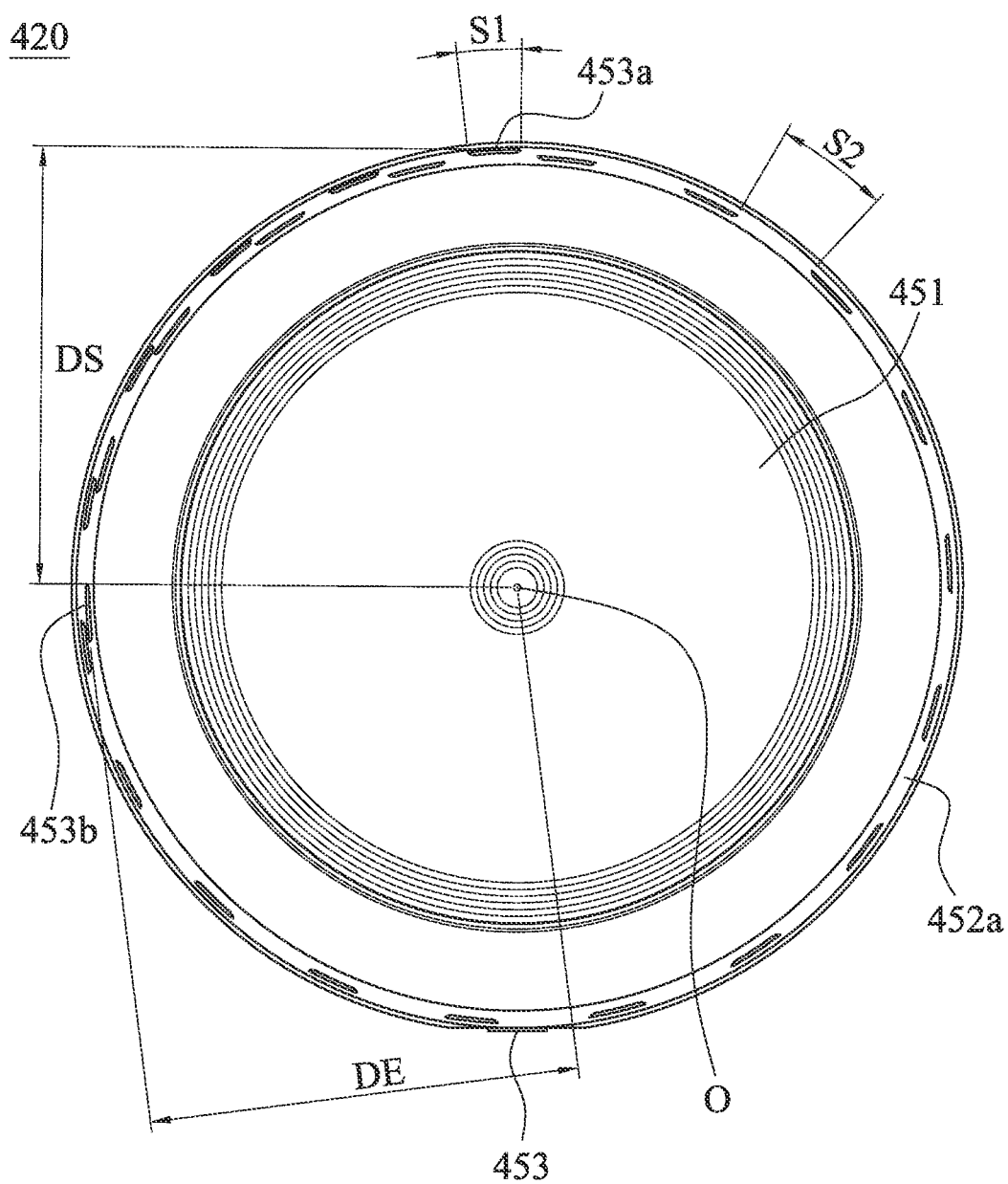
FIG. 4A is a schematic view of the lens element according to the 4th example of the present disclosure.
Figure 4B:
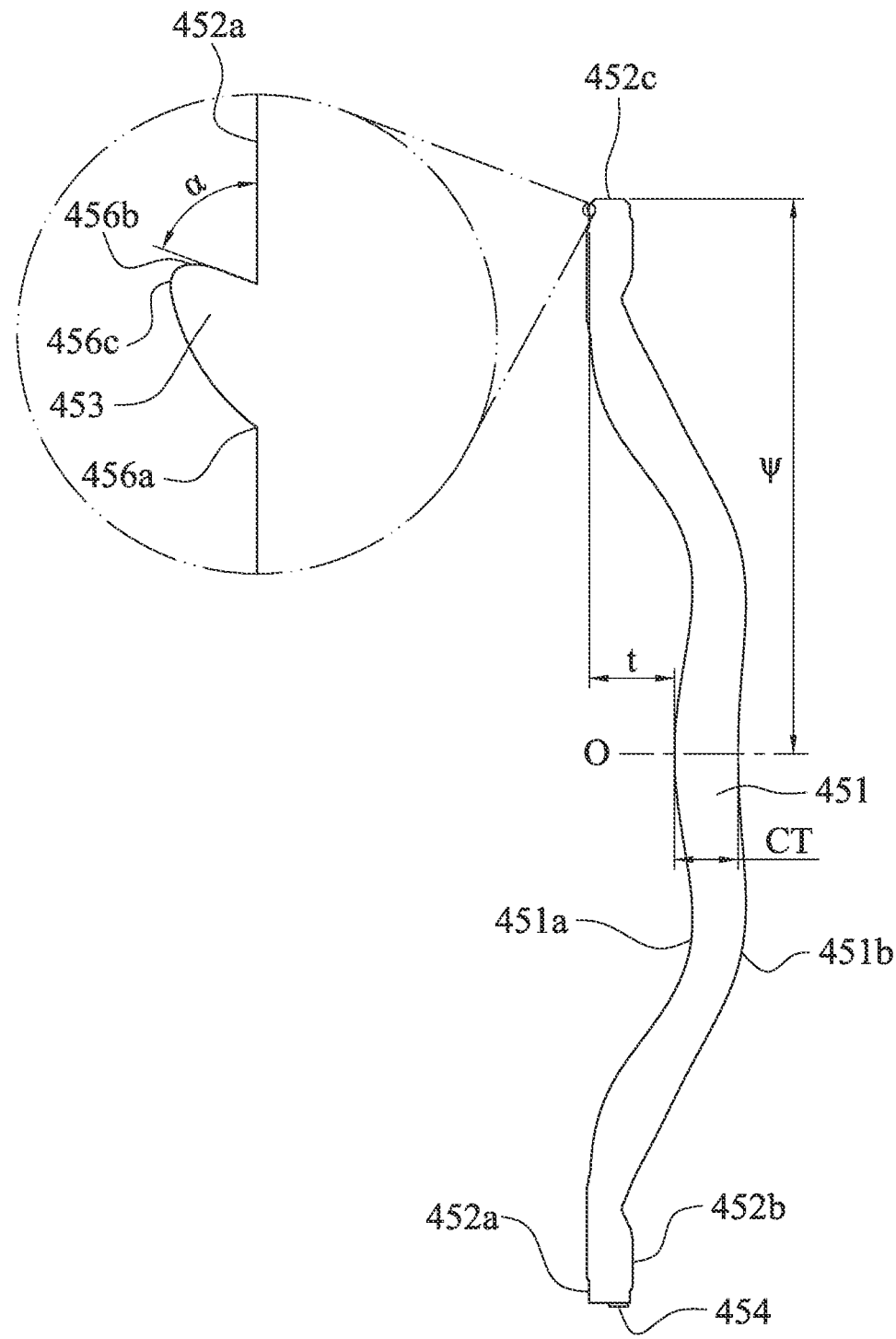
FIG. 4B is a schematic view of parameters of the lens element according to the 4th example in FIG. 4A.

FIG. 4A is a schematic view of the lens element 420 according to the 4th example of the present disclosure. FIG. 4B is a schematic view of parameters of the lens element 420 according to the 4th example in FIG. 4A. In FIGS. 4A and 4B, the lens element 420 has a central axis O, and includes an optical effective portion 451, a peripheral portion 452 and a plurality of protruding structures 453, wherein the central axis O passes through the optical effective portion 451, and the peripheral portion 452 surrounds the optical effective portion 451. The degree of fitting between the mold (not shown) and the lens element 420 can be enhanced during the molding process of the lens element 420 by disposing the protruding structures 453, so that the warpage or the deformation can be prevented during the demolding process.

According to the 4th example, a number of the protruding structures 453 is twenty four, but the number is not limited thereto.

The optical effective portion 451 includes a first optical surface 451a and a second optical surface 451b, wherein the second optical surface 451b and the first optical surface 451a are disposed relative to each other. Therefore, the lens element with high resolution can be provided.

The peripheral portion 452 surrounds the optical effective portion 451, and includes a first peripheral surface 452a, a second peripheral surface 452b and an outer annular surface 452c, wherein the first peripheral surface 452a and the first optical surface 451a face towards the same side, the second peripheral surface 452b and the second optical surface 451b face towards the same side, and the outer annular surface 452c is connected to the first peripheral surface 452a and the second peripheral surface 452b.

In FIG. 4A, the protruding structures 453 are disposed on the first peripheral surface 452a, the protruding structures 453 extend along a spiral path and are disposed at intervals, the spiral path surrounds the optical effective portion 451 and is tapered towards the central axis O, and the protruding structures 453 are gradually close along the spiral path towards the central axis O.

In FIG. 4B, each of at least three of the protruding structures 453 has a first identification end 456a and a second identification end 456b on a cross section vertical to the first peripheral surface 452a, wherein each of the first identification ends 456a is connected to the first peripheral surface 452a, and a spacing distance is between each of the second identification ends 456b and the first peripheral surface 452a. In particular, observing and identifying from a direction vertical to the first peripheral surface 452a, the first identification end 456a and the second identification end 456b can be one end of each of the protruding structures 453 close to the optical effective portion 451 and the other end of each of the protruding structures 453 away from the optical effective portion 451, respectively.

Moreover, each of the protruding structures 453 on the cross section vertical to the first peripheral surface 452a further has a top 456c, wherein the top 456c is a highest point of each of the protruding structures 453, and a spacing distance between the top 456c and the second identification end 456b along a direction vertical to the central axis O is less than a spacing distance between the top 456c and the first identification end 456a along the direction vertical to the central axis O. Therefore, the warpage or the deformation of the lens element 420 can be more effectively prevented.

In FIGS. 4A and 4B, the lens element 420 is formed by an injection molding, and the lens element 420 can further include at least one gate trace 454, wherein the gate trace 454 is disposed on the outer annular surface 452c. Therefore, the lens element with high precision and compact size can be provided.

The first one of the protruding structures 453 on the spiral path is a first protruding structure 453a, and the last one of the protruding structures 453 on the spiral path is a last protruding structure 453b, and an angle is formed between a side of each of the protruding structures 453 at the second identification end 456b and the first peripheral surface 452a. When a distance between the first protruding structure 453a and the central axis O is DS, a distance between the last protruding structure 453b and the central axis O is DE, a central distance between the first optical surface 451a and the first peripheral surface 452a is t, a central distance between the first optical surface 451a and the second optical surface 451b is CT, a distance between the outer annular surface 452c and the central axis O is ψ, a length of each of the protruding structures 453 along the spiral path is S1, a spacing distance between the protruding structures 453 along the spiral path is S2, and the angle is a, the following conditions of Table 4 are satisfied.

TABLE 4

| 4th example | | | |
|---|---|---|---|
| DS (mm) | 4.422 | S2 (mm) | 0.94 |
| DE (mm) | 4.35 | α (degree) | 70 |
| t (mm) | 0.69 | DS-DE (mm) | 0.072 |
| CT (mm) | 0.516 | t/CT | 1.337 |
| ψ (mm) | 4.5 | DS/ψ | 0.98 |
| S1 (mm) | 0.54 | S1/S2 | 0.57 |

Further, all of other structures and dispositions according to the 4th example are the same as the structures and the dispositions according to the 1st example, and will not be described again herein.

5th Example

Figure 5A:
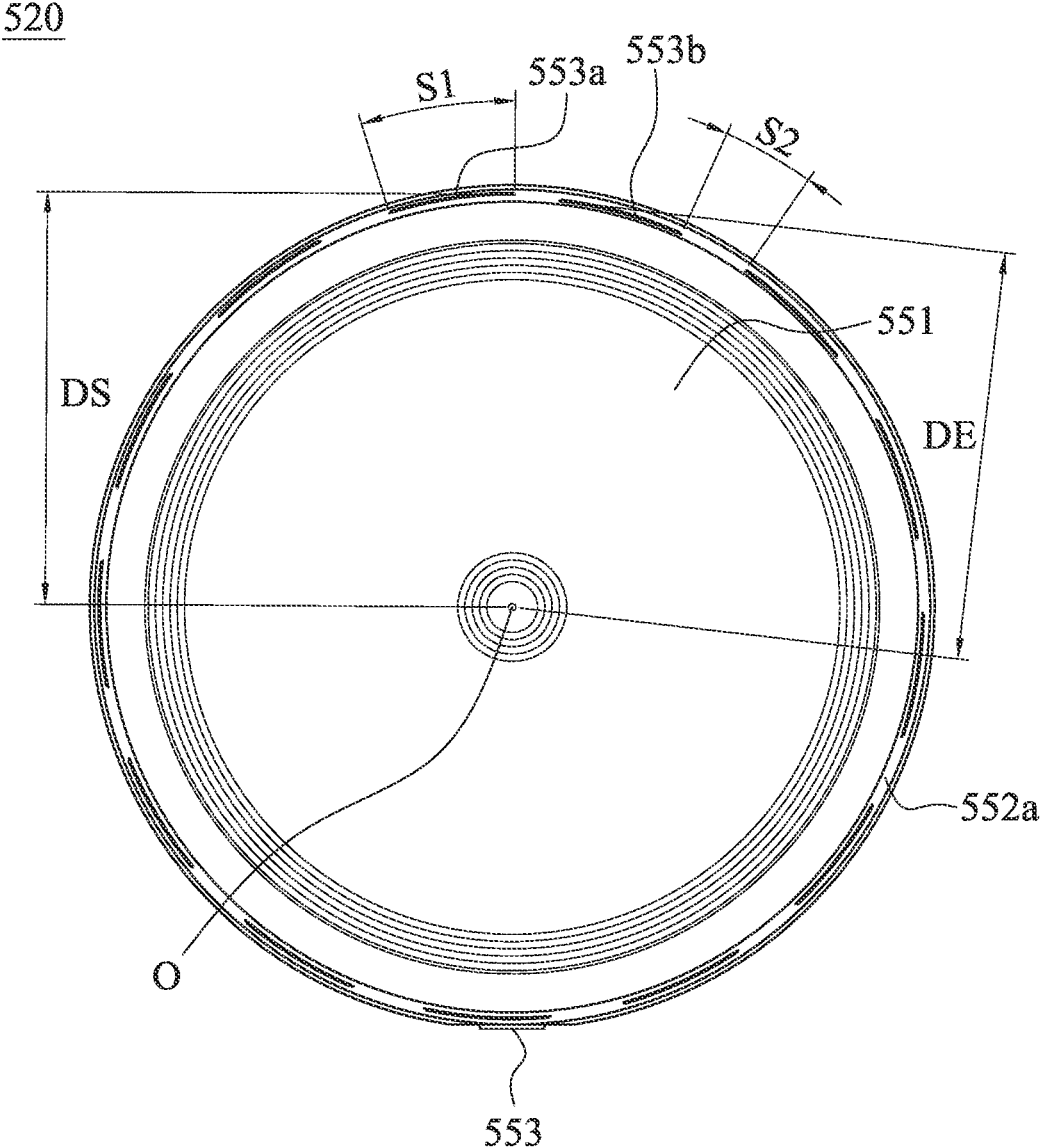
FIG. 5A is a schematic view of the lens element according to the 5th example of the present disclosure.
Figure 5B:
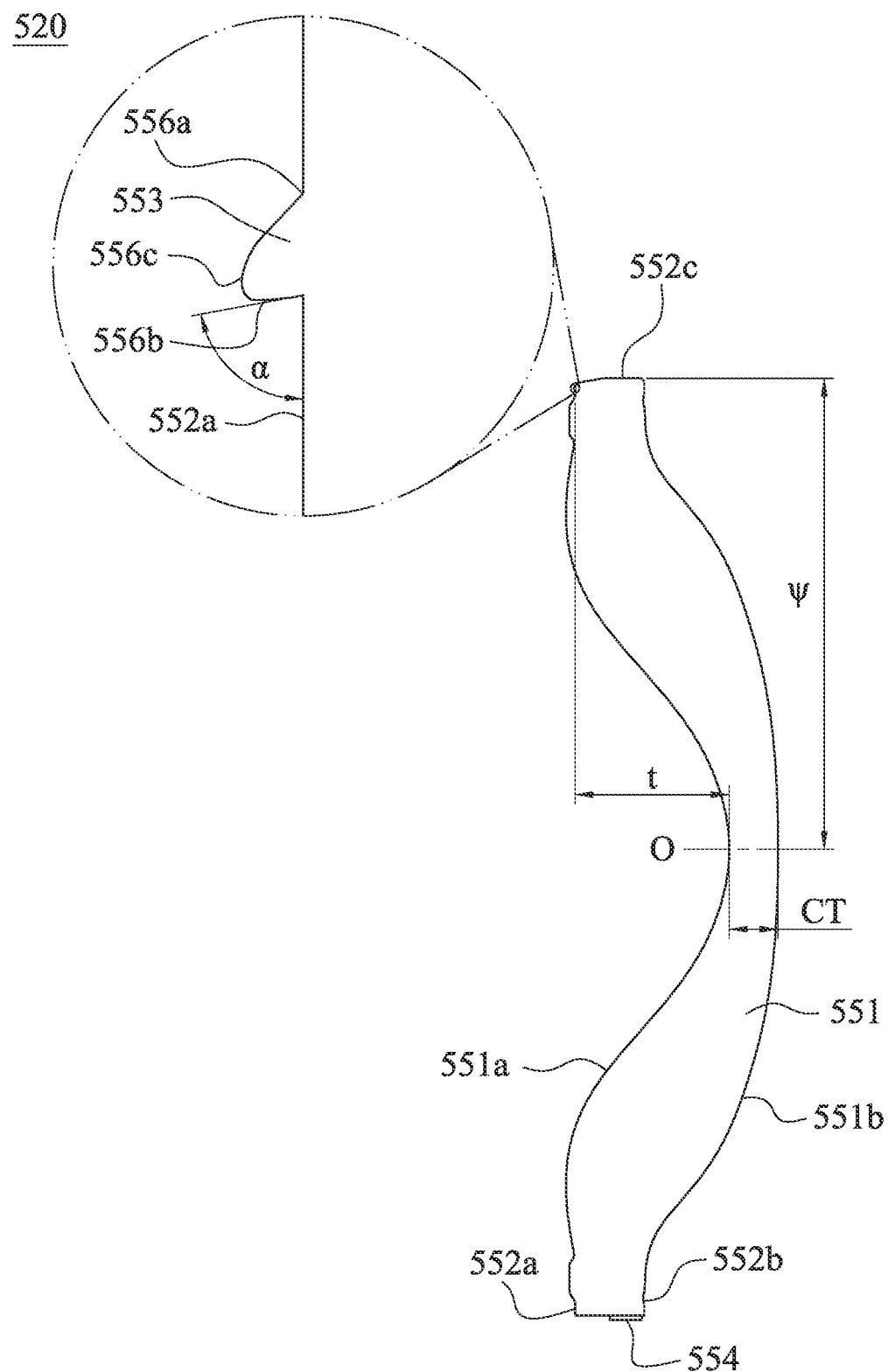
FIG. 5B is a schematic view of parameters of the lens element according to the 5th example in FIG. 5A.

FIG. 5A is a schematic view of the lens element 520 according to the 5th example of the present disclosure. FIG. 5B is a schematic view of parameters of the lens element 520 according to the 5th example in FIG. 5A. In FIGS. 5A and 5B, the lens element 520 has a central axis O, and includes an optical effective portion 551, a peripheral portion 552 and a plurality of protruding structures 553, wherein the central axis O passes through the optical effective portion 551, and the peripheral portion 552 surrounds the optical effective portion 551. The degree of fitting between the mold (not shown) and the lens element 520 can be enhanced during the molding process of the lens element 520 by disposing the protruding structures 553, so that the warpage or the deformation can be prevented during the demolding process.

According to the 5th example, a number of the protruding structures 553 is thirteen, but the number is not limited thereto.

The optical effective portion 551 includes a first optical surface 551a and a second optical surface 551b, wherein the second optical surface 551b and the first optical surface 551a are disposed relative to each other. Therefore, the lens element with high resolution can be provided.

The peripheral portion 552 surrounds the optical effective portion 551, and includes a first peripheral surface 552a, a second peripheral surface 552b and an outer annular surface 552c, wherein the first peripheral surface 552a and the first optical surface 551a face towards the same side, the second peripheral surface 552b and the second optical surface 551b face towards the same side, and the outer annular surface 552c is connected to the first peripheral surface 552a and the second peripheral surface 552b.

In FIG. 5A, the protruding structures 553 are disposed on the first peripheral surface 552a, the protruding structures 553 extend along a spiral path and are disposed at intervals, the spiral path surrounds the optical effective portion 551 and is tapered towards the central axis O, and the protruding structures 553 are gradually close along the spiral path towards the central axis O.

In FIG. 5B, each of at least three of the protruding structures 553 has a first identification end 556a and a second identification end 556b on a cross section vertical to the first peripheral surface 552a, wherein each of the first identification ends 556a is connected to the first peripheral surface 552a, and a spacing distance is between each of the second identification ends 556b and the first peripheral surface 552a. In particular, observing and identifying from a direction vertical to the first peripheral surface 552a, the first identification end 556a and the second identification end 556b can be one end of each of the protruding structures 553 away from the optical effective portion 551 and the other end of each of the protruding structures 553 close to the optical effective portion 551, respectively.

Moreover, each of the protruding structures 553 on the cross section vertical to the first peripheral surface 552a further has a top 556c, wherein the top 556c is a highest point of each of the protruding structures 553, and a spacing distance between the top 556c and the second identification end 556b along a direction vertical to the central axis O is less than a spacing distance between the top 556c and the first identification end 556a along the direction vertical to the central axis O. Therefore, the warpage or the deformation of the lens element 520 can be more effectively prevented.

In FIGS. 5A and 5B, the lens element 520 is formed by an injection molding, and the lens element 520 can further include at least one gate trace 554, wherein the gate trace 554 is disposed on the outer annular surface 552c. Therefore, the lens element with high precision and compact size can be provided.

The first one of the protruding structures 553 on the spiral path is a first protruding structure 553a, and the last one of the protruding structures 553 on the spiral path is a last protruding structure 553b, and an angle is formed between a side of each of the protruding structures 553 at the second identification end 556b and the first peripheral surface 552a. When a distance between the first protruding structure 553a and the central axis O is DS, a distance between the last protruding structure 553b and the central axis O is DE, a central distance between the first optical surface 551a and the first peripheral surface 552a is t, a central distance between the first optical surface 551a and the second optical surface 551b is CT, a distance between the outer annular surface 552c and the central axis O is ψ, a length of each of the protruding structures 553 along the spiral path is S1, a spacing distance between the protruding structures 553 along the spiral path is S2, and the angle is α, the following conditions of Table 5 are satisfied.

TABLE 5

| 5th example | | | |
|---|---|---|---|
| DS (mm) | 5.129 | S2 (mm) | 0.92 |
| DE (mm) | 5.079 | α (degree) | 78 |
| t (mm) | 1.715 | DS-DE (mm) | 0.05 |
| CT (mm) | 0.54 | t/CT | 3.176 |
| ψ (mm) | 5.245 | DS/ψ | 0.98 |
| S1 (mm) | 1.58 | S1/S2 | 1.72 |

Further, all of other structures and dispositions according to the 5th example are the same as the structures and the dispositions according to the 1st example, and will not be described again herein.

6th Example

Figure 6A:
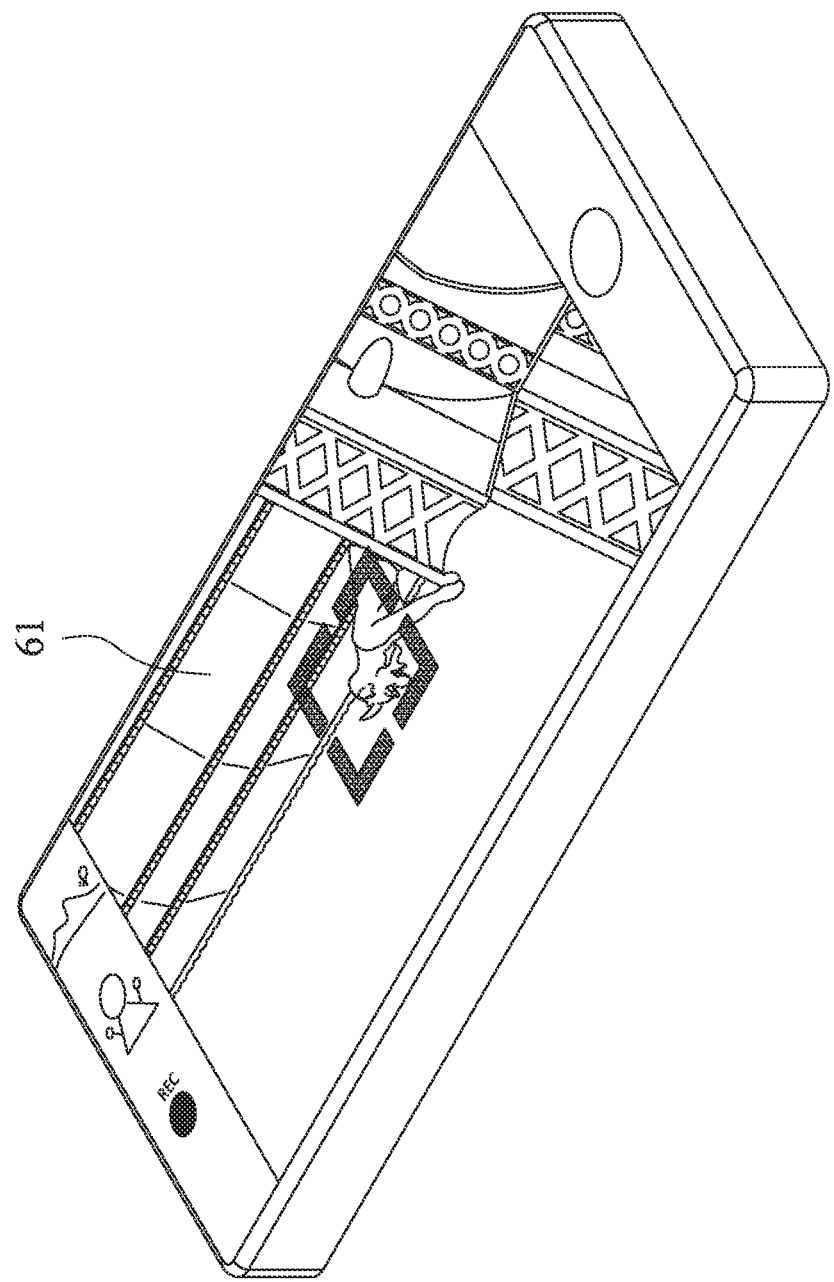
FIG. 6A is a schematic view of an electronic device according to the 6th example of the present disclosure.

FIG. 6A is a schematic view of an electronic device 60 according to the 6th example of the present disclosure. FIG.

Figure 6B:
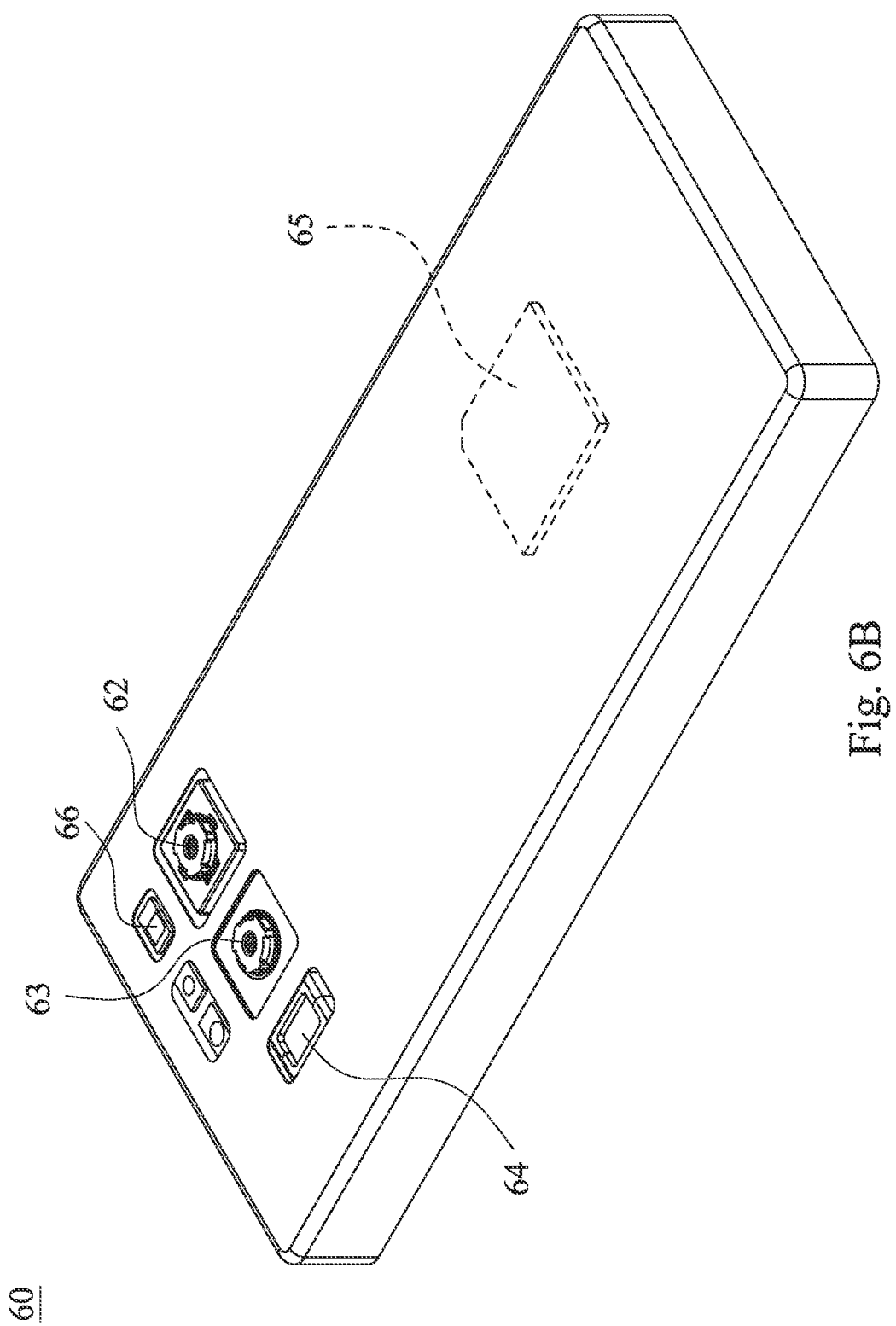
FIG. 6B is another schematic view of the electronic device according to the 6th example in FIG. 6A.

6B is another schematic view of the electronic device 60 according to the 6th example in FIG. 6A. In FIGS. 6A and 6B, the electronic device 60 is a smart phone, and includes a camera module (its reference numeral is omitted) and a user interface 61, wherein the camera module includes an imaging lens assembly (not shown) and an image sensor (not shown), and the image sensor is disposed on an image surface (not shown) of the imaging lens assembly. Moreover, the camera module can be an ultra-wide angle camera module 62, a high resolution camera module 63 and a telephoto camera module 64, and the user interface 61 is a touch screen, but the present disclosure is not limited thereto.

Moreover, the imaging lens assembly includes a plastic lens barrel (not shown) and an imaging lens element set (not shown), wherein the imaging lens element set can be accommodated in the plastic lens barrel, and the imaging lens element set includes at least one lens element (not shown). In particular, the lens element can be one of the lens elements according to the aforementioned 1st example to the 5th example, but the present disclosure is not limited thereto.

Users enter a shooting mode via the user interface 61, wherein the user interface 61 is configured to display the scene, and the shooting angle can be manually adjusted to switch the ultra-wide angle camera module 62, the high resolution camera module 63 and the telephoto camera module 64. At this moment, the imaging light is gathered on the image sensor via the camera module, and an electronic signal about an image is output to an image signal processor (ISP) 65.

In FIG. 6B, to meet a specification of the electronic device 60, the electronic device 60 can further include an optical anti-shake mechanism (not shown). Furthermore, the electronic device 60 can further include at least one focusing assisting module (its reference numeral is omitted) and at least one sensing element (not shown). The focusing assisting module can be a flash module 66 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 60 equipped with an auto-focusing mechanism and the optical anti-shake mechanism can be enhanced to achieve the superior image quality. Furthermore, the electronic device 60 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 61 and manually operate the view finding range on the user interface 61 to achieve the autofocus function of what you see is what you get.

Moreover, the camera module, the image sensor, the optical anti-shake mechanism, the sensing element and the focusing assisting module can be disposed on a flexible printed circuit board (FPC) (not shown) and electrically connected to the associated components, such as the image signal processor 65, via a connector (not shown) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 6th example, the electronic device 60 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 65, via corresponding connectors to perform the capturing process. In other examples (not shown herein), the sensing elements and the focusing assisting modules can also be disposed on the main board of the electronic device or carrier boards of other types according to requirements of the mechanical design and the circuit layout.

Furthermore, the electronic device 60 can further include, but not be limited to, a display, a control unit, a storage unit, a random access memory (RAM), a read-only memory (ROM), or the combination thereof.

Figure 6C:
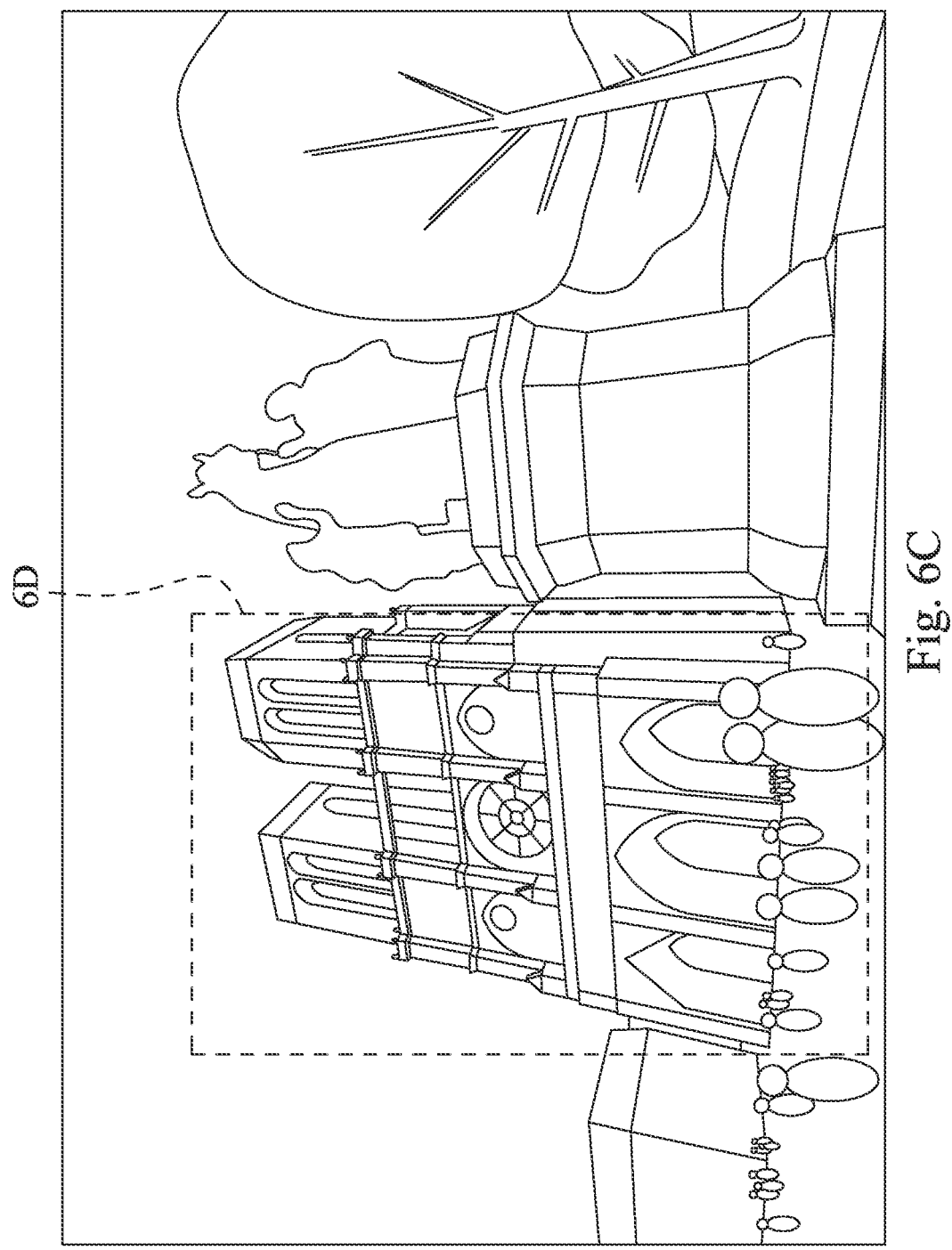
FIG. 6C is a schematic view of an image captured via the electronic device according to the 6th example in FIG. 6A.

FIG. 6C is a schematic view of an image captured via the electronic device 60 according to the 6th example in FIG. 6A. In FIG. 6C, the larger range of the image can be captured via the ultra-wide angle camera module 62, and the ultra-wide angle camera module 62 has the function of accommodating wider range of the scene.

Figure 6D:
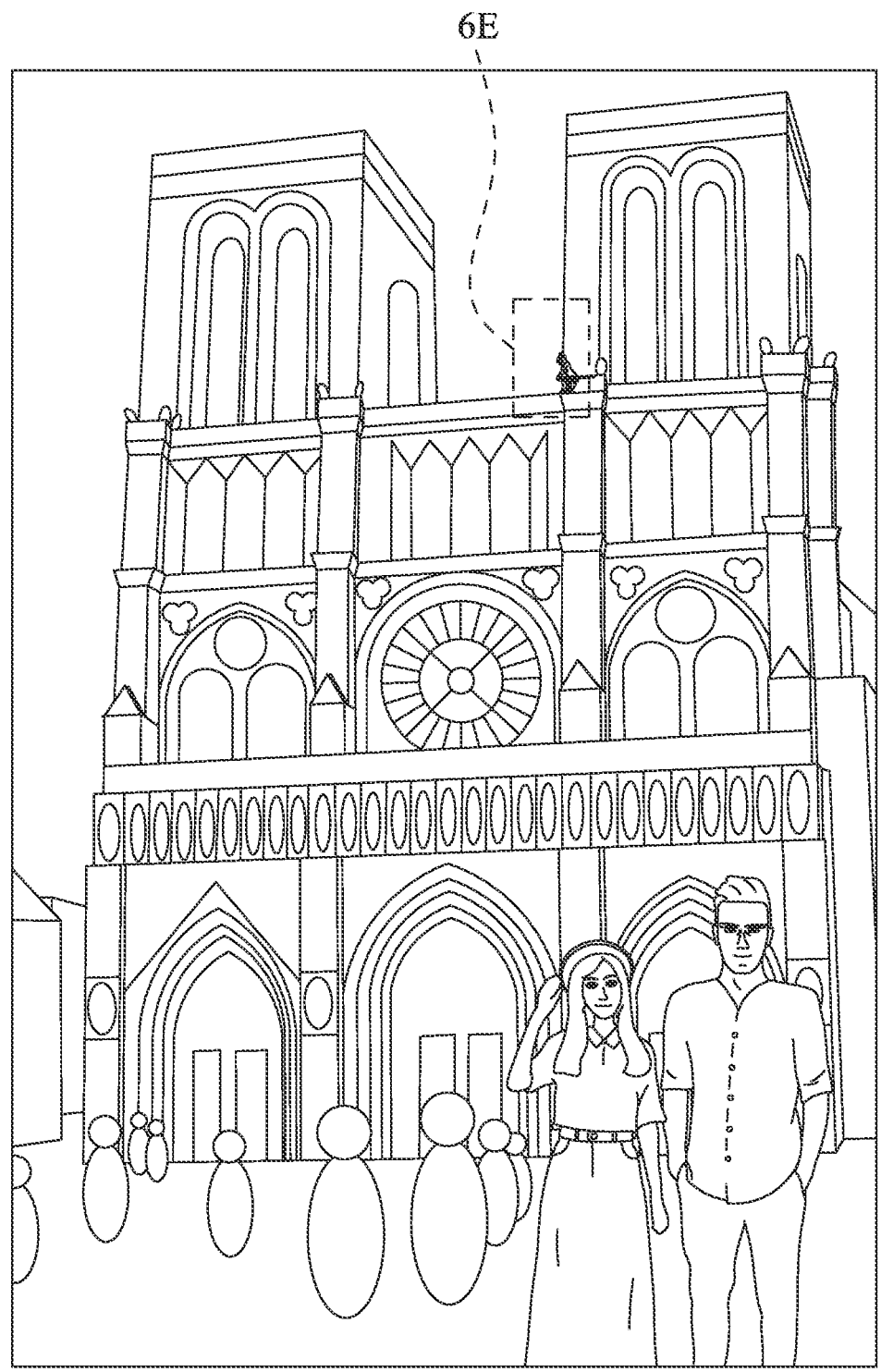
FIG. 6D is another schematic view of an image captured via the electronic device according to the 6th example in FIG. 6A.

FIG. 6D is another schematic view of an image captured via the electronic device 60 according to the 6th example in FIG. 6A. In FIG. 6D, the image of the certain range with the high resolution can be captured via the high resolution camera module 63, and the high resolution camera module 63 has the function of the high resolution and the low deformation.

Figure 6E:
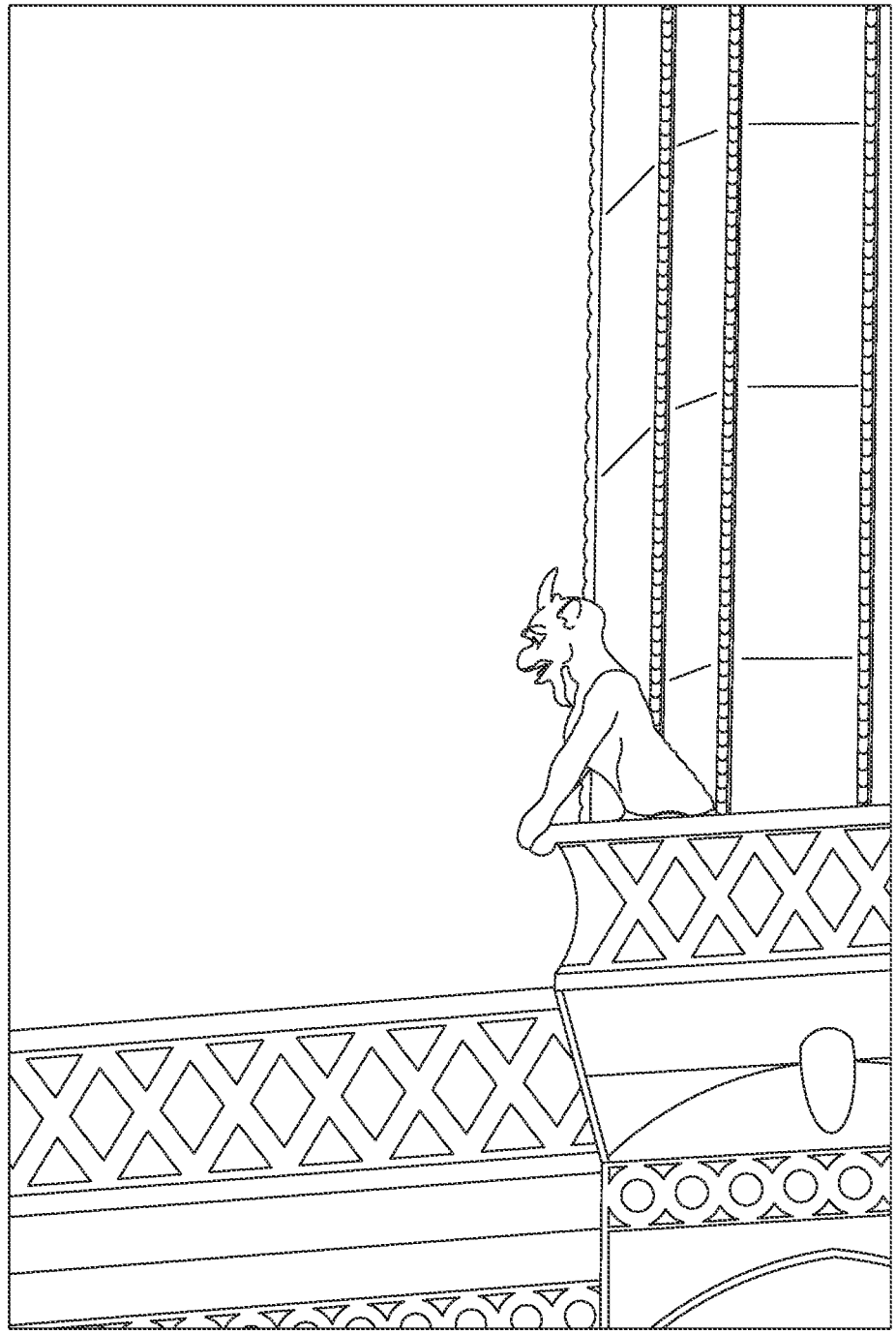
FIG. 6E is still another schematic view of an image captured via the electronic device according to the 6th example in FIG. 6A.

FIG. 6E is still another schematic view of an image captured via the electronic device 60 according to the 6th example in FIG. 6A. In FIG. 6E, the telephoto camera module 64 has the enlarging function of the high magnification, and the distant image can be captured and enlarged with high magnification via the telephoto camera module 64.

In FIGS. 6C to 6E, the zooming function can be obtained via the electronic device 60, when the scene is captured via the camera module with different focal lengths cooperated with the function of image processing.

7th Example

Figure 7:
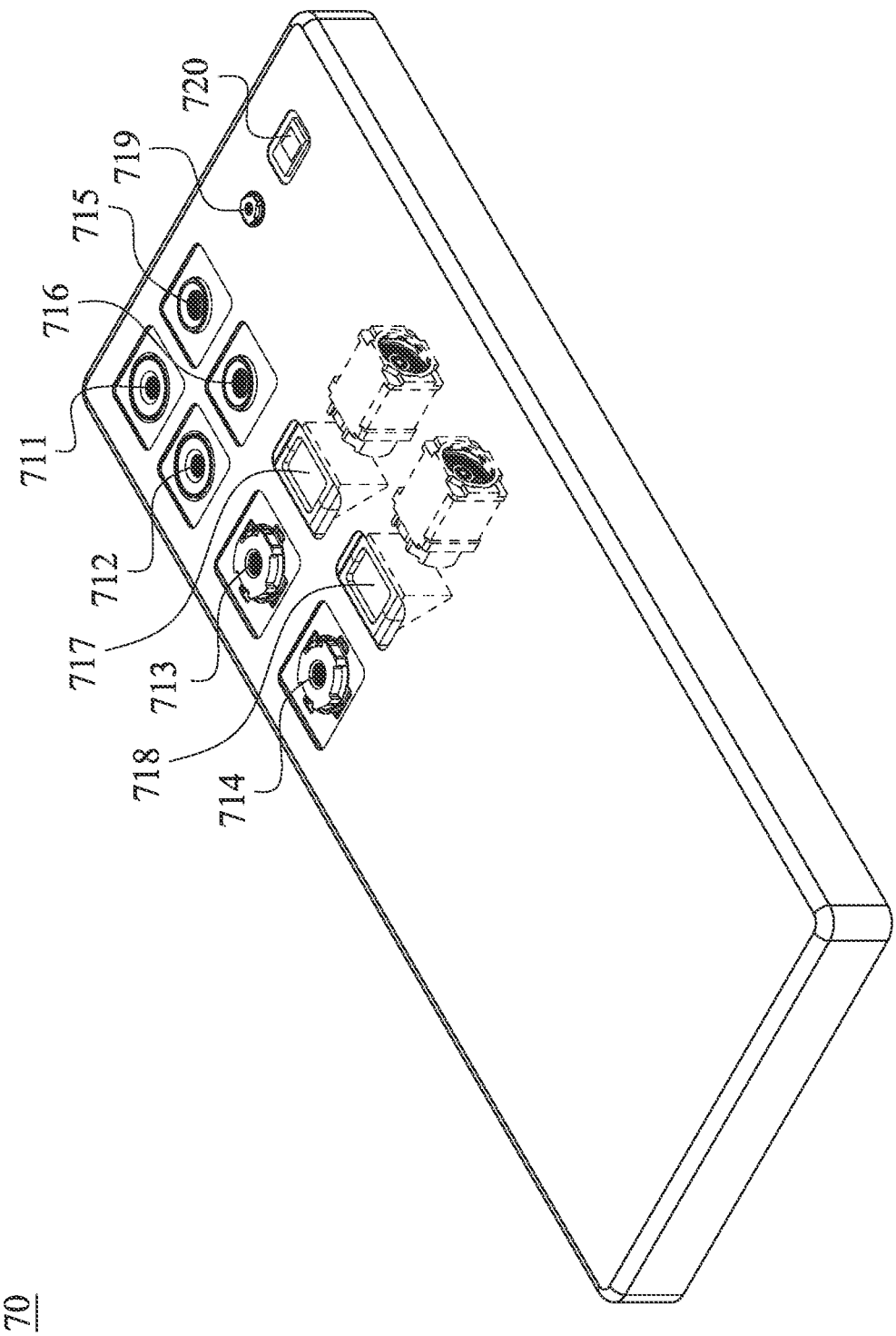
FIG. 7 is a schematic view of an electronic device according to the 7th example of the present disclosure.

FIG. 7 is a schematic view of an electronic device 70 according to the 7th example of the present disclosure. In FIG. 7, the electronic device 70 is a smart phone, and includes a camera module (its reference numeral is omitted), wherein the camera module includes an imaging lens assembly (not shown) and an image sensor (not shown), and the image sensor is disposed on an image surface (not shown) of the imaging lens assembly. Moreover, the camera module can be ultra-wide angle camera modules 711, 712, wide angle camera modules 713, 714, telephoto camera modules 715, 716, 717, 718 and a Time-Of-Flight (TOF) module 719. The TOF module 719 can be another type of the camera module, and the disposition is not limited thereto.

Moreover, the imaging lens assembly includes a plastic lens barrel (not shown) and an imaging lens element set (not shown), wherein the imaging lens element set can be accommodated in the plastic lens barrel, and the imaging lens element set includes at least one lens element (not shown). In particular, the lens element can be one of the lens elements according to the aforementioned 1st example to the 5th example, but the present disclosure is not limited thereto.

Further, the telephoto camera modules 717, 718 are configured to fold the light, but the present disclosure is not limited thereto.

To meet a specification of the electronic device 70, the electronic device 70 can further include an optical anti-shake mechanism (not shown). Furthermore, the electronic device 70 can further include at least one focusing assisting module (not shown) and at least one sensing element (not shown). The focusing assisting module can be a flash module 720 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 70 equipped with an auto-focusing mechanism and the optical anti-shake mechanism can be enhanced to achieve the superior image quality. Furthermore, the electronic device 70 according to the present disclosure can have a capturing function with multiple modes, such as taking optimized selfies, High Dynamic Range (HDR) under a low light condition, 4K Resolution recording and so on.

Further, all of other structures and dispositions according to the 7th example are the same as the structures and the dispositions according to the 6th example, and will not be described again herein.

8th Example

Figure 8A:
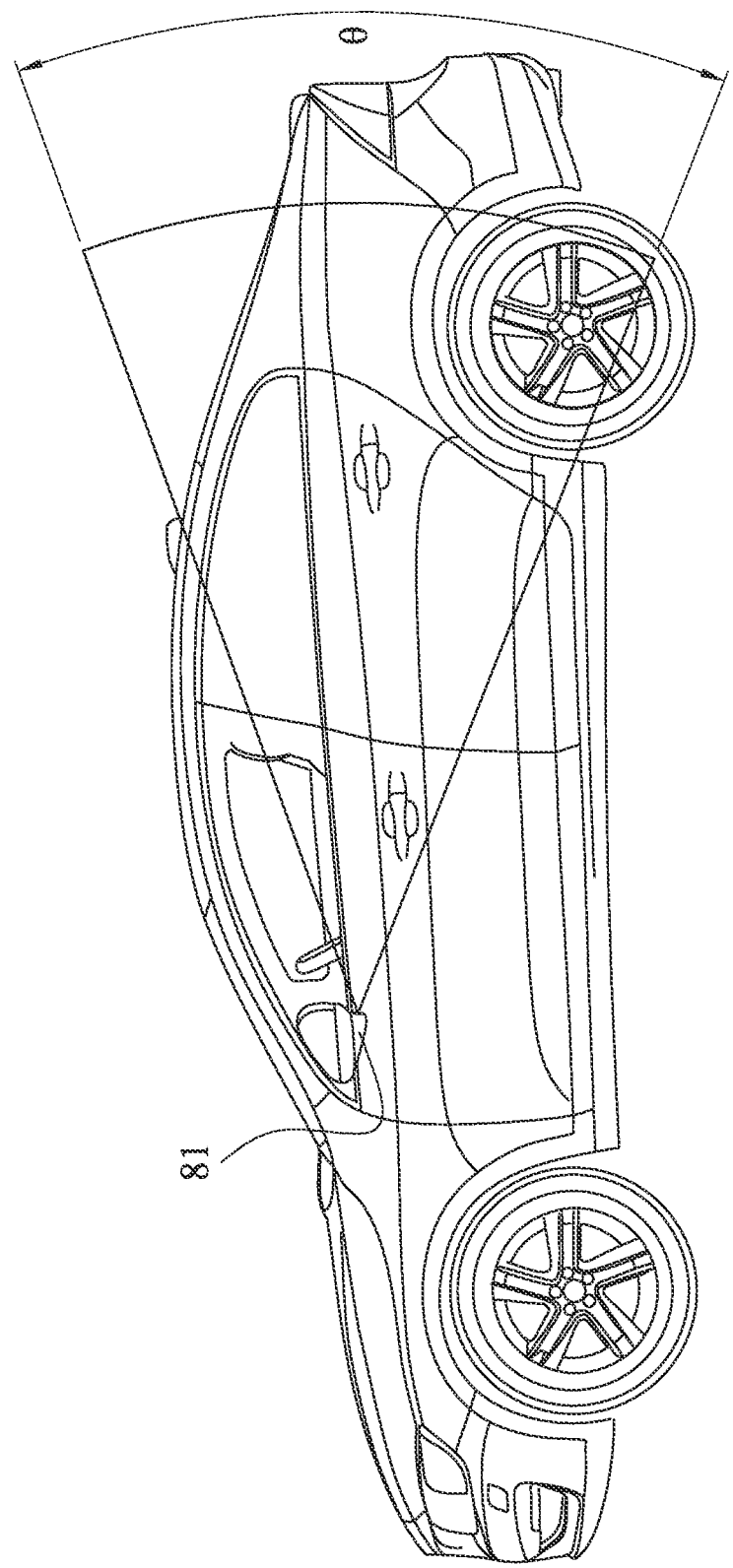
FIG. 8A is a schematic view of a vehicle instrument according to the 8th example of the present disclosure.
Figure 8B:
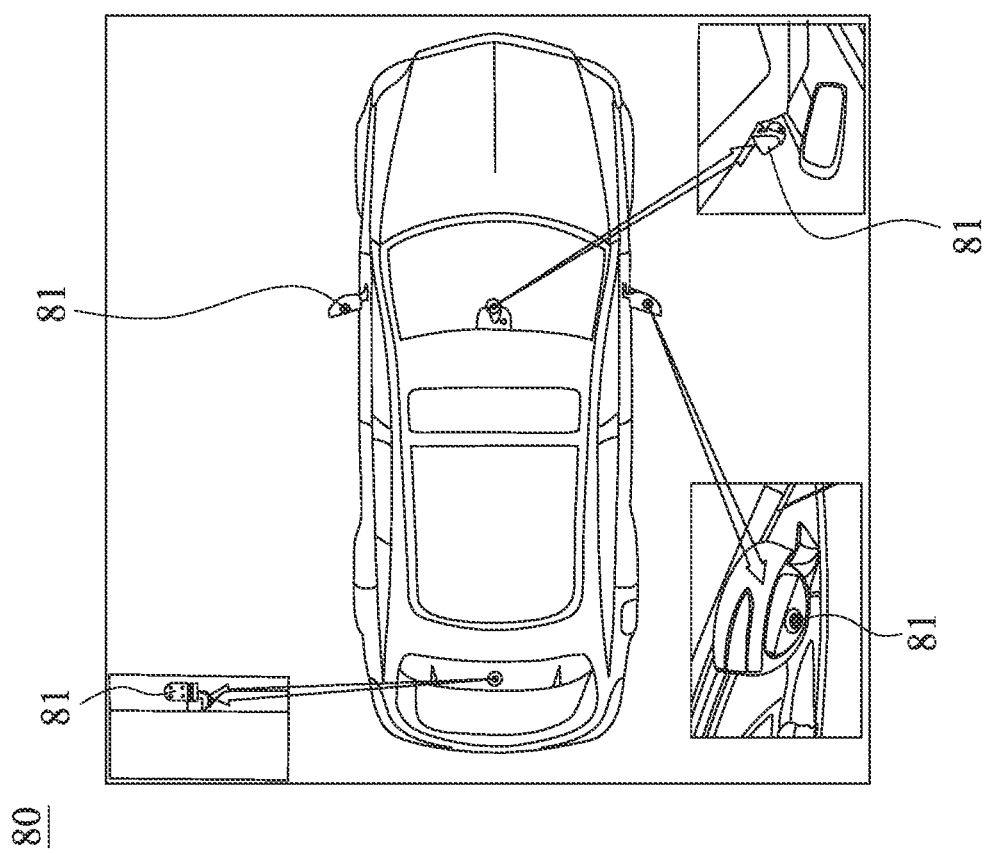
FIG. 8B is another schematic view of the vehicle instrument according to the 8th example in FIG. 8A.
Figure 8C:
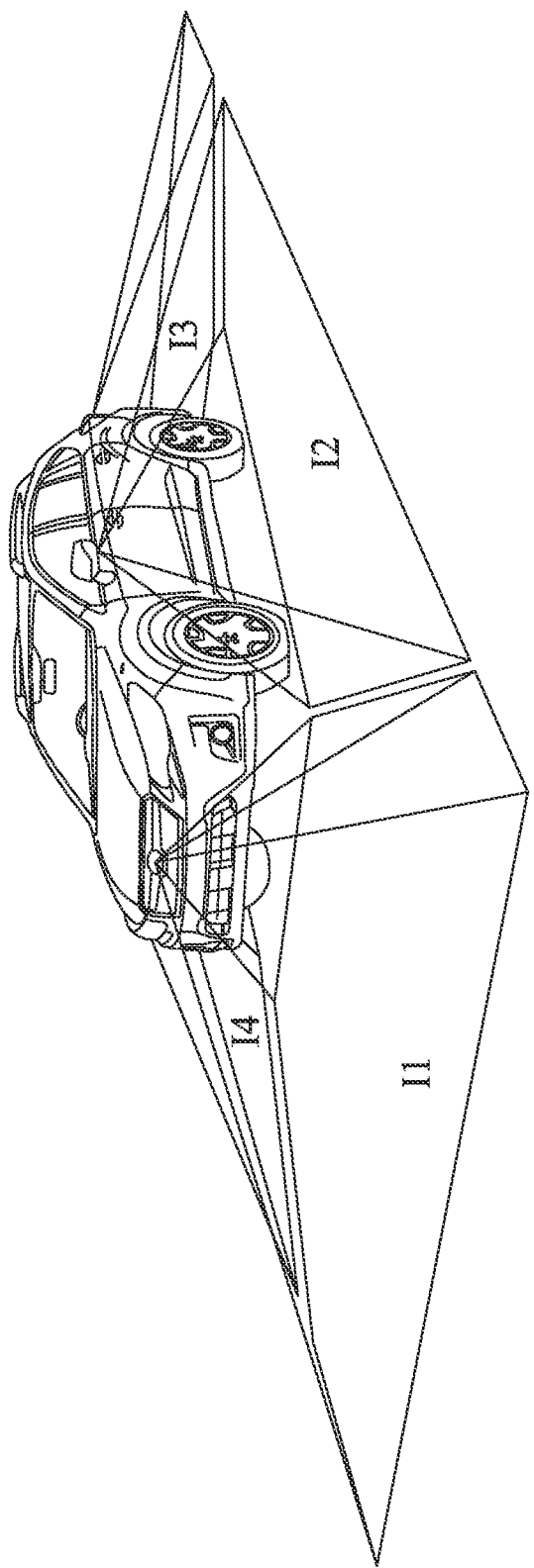
FIG. 8C is still another schematic view of the vehicle instrument according to the 8th example in FIG. 8A.

FIG. 8A is a schematic view of a vehicle instrument 80 according to the 8th example of the present disclosure. FIG. 8B is another schematic view of the vehicle instrument 80 according to the 8th example in FIG. 8A. FIG. 8C is still another schematic view of the vehicle instrument 80 according to the 8th example in FIG. 8A. In FIGS. 8A to 8C, the vehicle instrument 80 includes a plurality of camera modules 81, and each of the camera modules 81 includes an imaging lens assembly (not shown) and an image sensor (not shown), and the image sensor is disposed on an image surface (not shown) of the imaging lens assembly. According to the 8th example, a number of the camera modules 81 is six, but the present disclosure is not limited thereto.

Moreover, the imaging lens assembly includes a plastic lens barrel (not shown) and an imaging lens element set (not shown), wherein the imaging lens element set can be accommodated in the plastic lens barrel, and the imaging lens element set includes at least one lens element (not shown). In particular, the lens element can be one of the lens elements according to the aforementioned 1st example to the 5th example, but the present disclosure is not limited thereto.

In FIGS. 8A and 8B, the camera modules 81 are automotive camera modules, two of the camera modules 81 are located under rearview mirrors on a left side and a right side, respectively, and the aforementioned camera modules 81 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 8B, another two of the camera modules 81 can be disposed in the inner space of the vehicle instrument 80. In particular, the aforementioned two camera modules 81 are disposed on a location close to the rearview mirror inside the vehicle instrument 80 and a location close to the rear car window, respectively. Moreover, the camera modules 81 can be further disposed on the rearview mirrors on the left side and the right side except the mirror surface, respectively, but the present disclosure is not limited thereto.

In FIG. 8C, another two of the camera modules 81 can be disposed on a front end of the vehicle instrument 80 and a rear end of the vehicle instrument 80, respectively. By disposing the camera modules 81 on the front end and the rear end of the vehicle instrument 80 and under the rearview mirror on the left side of the vehicle instrument 80 and the right side of the vehicle instrument 80, it is favorable for the drivers obtaining the external space information in addition to the driving seat, such as the external space informations I1, I2, I3, I4, but the present disclosure is not limited thereto. Therefore, more visual angles can be provided to reduce the blind spot, so that the driving safety can be improved.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A lens element, having a central axis, and comprising:
an optical effective portion, the central axis passing through the optical effective portion, and comprising:
a first optical surface; and
a second optical surface, the second optical surface and the first optical surface disposed relative to each other;
a peripheral portion surrounding the optical effective portion, and comprising:
a first peripheral surface, the first peripheral surface and the first optical surface facing towards the same side;
a second peripheral surface, the second peripheral surface and the second optical surface facing towards the same side; and
an outer annular surface connected to the first peripheral surface and the second peripheral surface; and
a plurality of protruding structures disposed on the first peripheral surface, the protruding structures extending along a spiral path and disposed at intervals, and the spiral path surrounding the optical effective portion and tapered towards the central axis;
wherein a first one of the protruding structures on the spiral path is a first protruding structure, and a last one of the protruding structures on the spiral path is a last protruding structure;
wherein a distance between the first protruding structure and the central axis is DS, a distance between the last protruding structure and the central axis is DE, and the following condition is satisfied:

$$0.005 \text{ mm} < DS - DE < 1 \text{ mm}.$$

2. The lens element of claim 1, wherein a central distance between the first optical surface and the first peripheral surface is t, a central distance between the first optical surface and the second optical surface is CT, and the following condition is satisfied:

0.8<t/CT<5.5.

3. The lens element of claim 2, wherein the central distance between the first optical surface and the first peripheral surface is t, the central distance between the first optical surface and the second optical surface is CT, and the following condition is satisfied:

1.0<t/CT<5.0.

4. The lens element of claim 1, wherein a distance between the outer annular surface and the central axis is ψ, the distance between the first protruding structure and the central axis is DS, and the following condition is satisfied:

0.7<DS/ψ<1.

5. The lens element of claim 1, wherein a length of each of the protruding structures along the spiral path is S1, a spacing distance between the protruding structures along the spiral path is S2, and the following condition is satisfied:

0.2<S1/S2<5.

6. The lens element of claim 1, wherein the distance between the first protruding structure and the central axis is DS, the distance between the last protruding structure and the central axis is DE, and the following condition is satisfied:

0.015 mm≤DS−DE≤0.8 mm.

7. The lens element of claim 1, wherein the protruding structures are gradually close along the spiral path towards the central axis.

8. The lens element of claim 1, wherein the lens element is formed by an injection molding, the lens element further comprises at least one gate trace, and the at least one gate trace is disposed on the outer annular surface.

9. The lens element of claim 1, wherein at least one of the first optical surface and the second optical surface is an optical aspheric surface.

10. An imaging lens assembly, comprising:
a plastic lens barrel; and
an imaging lens element set accommodated in the plastic lens barrel, and comprising:
at least one of the lens element of claim 1.

11. The imaging lens assembly of claim 10, wherein the at least one lens element further comprises a receiving surface, the receiving surface and the first optical surface face towards the same side, the receiving surface is closer to the optical effective portion than the protruding structures to the optical effective portion, and the receiving surface is against an element adjacent to the receiving surface.

12. A camera module, comprising:
the imaging lens assembly of claim 10; and
an image sensor disposed on an image surface of the imaging lens assembly.

13. An electronic device, comprising:
the camera module of claim 12.

14. A lens element, having a central axis, and comprising:
an optical effective portion, comprising:
a first optical surface; and
a second optical surface, the second optical surface and the first optical surface disposed relative to each other;
a peripheral portion surrounding the optical effective portion, and comprising:
a first peripheral surface, the first peripheral surface and the first optical surface facing towards the same side;
a second peripheral surface, the second peripheral surface and the second optical surface facing towards the same side; and
an outer annular surface connected to the first peripheral surface and the second peripheral surface; and
a plurality of protruding structures disposed on the first peripheral surface, the protruding structures extending along a spiral path and disposed at intervals, and the spiral path surrounding the optical effective portion and tapered towards the central axis;
wherein each of at least three of the protruding structures has a first identification end and a second identification end on a cross section vertical to the first peripheral surface, each of the first identification ends is connected to the first peripheral surface, and a spacing distance is between each of the second identification ends and the first peripheral surface;
wherein an angle is formed between a side of each of the protruding structures at the second identification end and the first peripheral surface, the angle is α, and the following condition is satisfied:

45 degrees≤α≤90 degrees.

15. The lens element of claim 14, wherein the angle is α, and the following condition is satisfied:

60 degrees≤α≤90 degrees.

16. The lens element of claim 14, wherein a central distance between the first optical surface and the first peripheral surface is t, a central distance between the first optical surface and the second optical surface is CT, and the following condition is satisfied:

0.8<t/CT<5.5.

17. The lens element of claim 16, wherein the central distance between the first optical surface and the first peripheral surface is t, the central distance between the first optical surface and the second optical surface is CT, and the following condition is satisfied:

1.0<t/CT<5.0.

18. The lens element of claim 14, wherein a first one of the protruding structures on the spiral path is a first protruding structure, a distance between the outer annular surface and the central axis is ψ, a distance between the first protruding structure and the central axis is DS, and the following condition is satisfied:

0.7<DS/ψ<1.

19. The lens element of claim 14, wherein a length of each of the protruding structures along the spiral path is S1, a spacing distance between the protruding structures along the spiral path is S2, and the following condition is satisfied:

0.2<S1/S2<5.

20. The lens element of claim 14, wherein the protruding structures are gradually close along the spiral path towards the central axis.

21. The lens element of claim 14, wherein each of the protruding structures on the cross section vertical to the first peripheral surface further has a top, the top is a highest point of each of the protruding structures, and a spacing distance between the top and the second identification end along a direction vertical to the central axis is less than a spacing distance between the top and the first identification end along the direction vertical to the central axis.

22. An imaging lens assembly, comprising:
a plastic lens barrel; and an imaging lens element set accommodated in the plastic lens barrel, and comprising:
    at least one of the lens element of claim 14.

23. The imaging lens assembly of claim 22, wherein the at least one lens element further comprises a receiving surface, the receiving surface and the first optical surface face towards the same side, the receiving surface is closer to the optical effective portion than the protruding structures to the optical effective portion, and the receiving surface is against an element adjacent to the receiving surface.

24. A camera module, comprising:
    the imaging lens assembly of claim 22; and
    an image sensor disposed on an image surface of the imaging lens assembly.

25. An electronic device, comprising:
    the camera module of claim 24.

* * * * *